US006972902B1

(12) United States Patent
Chen et al.

(10) Patent No.: US 6,972,902 B1
(45) Date of Patent: Dec. 6, 2005

(54) TELESCOPE SYSTEM HAVING AUTO-TRACKING ALTITUDE-AZIMUTHAL MOUNT AND METHODS FOR CALIBRATING SAME

(75) Inventors: Chin Chuan Chen, Richmond (CA); Yan Liu, Richmond (CA)

(73) Assignee: Pacific Telescope Corp., Richmond (CA)

( * ) Notice: Subject to any disclaimer, the term of this patent is extended or adjusted under 35 U.S.C. 154(b) by 0 days.

(21) Appl. No.: 10/950,568

(22) Filed: Sep. 28, 2004

(51) Int. Cl.$^7$ ............................................. G02B 23/00
(52) U.S. Cl. ..................... 359/429; 359/399; 359/900
(58) Field of Search ................................ 359/900, 399, 359/429, 430; 356/138, 614

(56) References Cited

U.S. PATENT DOCUMENTS

| | | | | |
|---|---|---|---|---|
| 4,400,066 | A | * | 8/1983 | Byers .......................... 359/430 |
| 4,682,091 | A | * | 7/1987 | Krewalk et al. ............ 318/685 |
| 4,764,881 | A | | 8/1988 | Gagnon |
| 5,124,844 | A | | 6/1992 | Wraight |
| 5,133,050 | A | | 7/1992 | George et al. |
| 5,311,203 | A | | 5/1994 | Norton |
| 5,508,844 | A | | 4/1996 | Blake, Sr. |
| 6,304,376 | B1 | * | 10/2001 | Baun et al. .................. 359/429 |
| 6,366,349 | B1 | | 4/2002 | Houde-Walter |
| 6,369,942 | B1 | | 4/2002 | Hedrick et al. |
| 6,392,799 | B1 | | 5/2002 | Baun et al. |
| 6,563,636 | B1 | | 5/2003 | Baun et al. |
| 6,603,602 | B1 | | 8/2003 | McWilliams |
| 6,671,091 | B2 | | 12/2003 | McWilliams |
| 2001/0033416 | A1 | | 10/2001 | Baun et al. |
| 2003/0025994 | A1 | | 2/2003 | McWilliams |
| 2003/0156324 | A1 | | 8/2003 | Baun et al. |
| 2003/0197930 | A1 | | 10/2003 | Baun et al. |
| 2004/0047036 | A1 | | 3/2004 | Baun et al. |
| 2004/0051942 | A1 | | 3/2004 | Compton |
| 2004/0085632 | A1 | | 5/2004 | Shen |
| 2004/0090673 | A1 | | 5/2004 | McWilliams |

FOREIGN PATENT DOCUMENTS

| | | |
|---|---|---|
| CA | 2347370 | 5/2000 |
| CA | 2356340 | 5/2000 |

(Continued)

OTHER PUBLICATIONS

Bill Burton; Ready, Compute, Aim; (1998) Astronomy Magazine, pp. 194-198.

(Continued)

*Primary Examiner*—Mark A. Robinson
*Assistant Examiner*—Mark Consilvio
(74) *Attorney, Agent, or Firm*—Oyen Wiggs Green & Mutala LLP

(57) ABSTRACT

One aspect of the invention provides a method for calibrating an alt-az telescope system with a latitude of an observer location. The telescope system comprises a telescope tube mounted for pivotal motion about altitude and azimuthal axes and a latitude indicator coupled to a corresponding one of the altitude and azimuthal axes. The latitude indicator indicates a latitude value which varies with movement of the telescope tube about the corresponding axis. The method involves obtaining encoder information indicative of a first angular position of the telescope tube about the corresponding axis, wherein at the first angular position, the latitude indicator indicates a first latitude value. The orientation of the telescope tube is then adjusted to a second angular position, wherein at the second angular position, the latitude indicator indicates a second latitude value that differs from the first latitude value by an amount corresponding to the observer latitude. The method then involves subtracting the encoder information at the first angular position from the encoder information at the second angular position to determine a difference value indicative of the latitude of the observer location.

41 Claims, 14 Drawing Sheets

FOREIGN PATENT DOCUMENTS

| | | |
|---|---|---|
| DE | 19916138 | 10/2000 |
| JP | 60201317 | 10/1985 |
| JP | 62168109 | 7/1987 |
| JP | 1032219 | 2/1989 |
| JP | 2069711 | 3/1990 |
| JP | 4106513 | 4/1992 |
| JP | 2000305024 | 11/2000 |
| WO | WO 00/25167 | 5/2000 |
| WO | WO 00/25168 | 5/2000 |
| WO | WO 02/082167 | 10/2002 |

OTHER PUBLICATIONS

LX200 Telescope Manual; Meade Instruments Corporation; (1996).

Don Tabbutt, Bill Arnett, Paul Goelz and Tom Krajci; Internet postings; (1996-1998).

* cited by examiner

TELESCOPE SYSTEM HAVING AUTO-TRACKING ALTITUDE-AZIMUTHAL MOUNT AND METHODS FOR CALIBRATING SAME

TECHNICAL FIELD

The invention relates to the field of telescopes. Particular embodiments of the invention provide telescope systems having automatic tracking altitude-azimuthal mounts and methods for calibrating same.

BACKGROUND

Telescopes are typically supported by adjustable mounts, which are capable of adjusting the orientation of the telescope for viewing different objects. One popular telescope mount is the altitude-azimuthal mount, referred to hereinafter as the "alt-az mount". FIG. 1 illustrates a typical prior art telescope system 11 incorporating an alt-az mount 10 which supports a telescope tube 12. A user can adjust alt-az mount 10 to pivot telescope tube 12 about a horizontal altitude axis 14 (i.e. in either angular direction indicated by double-headed arrow 18). A user may also independently adjust alt-az mount 10 to pivot telescope tube 12 about a vertical azimuthal axis 16 (i.e. in either angular direction indicated by double-headed arrow 20).

Alt-az mounts are popular for telescope systems because alt-az mounts can be made relatively robust to support large telescope tubes (e.g. Dobsonian telescope tubes) and alt-az mounts can be fabricated from relatively inexpensive components. Alt-az coordinates are expressed in degrees of altitude (Alt) and degrees of azimuth (Az). Alt represents a measurement of degrees upward from the horizon to an object of interest and has a range of $-90° \leq Alt \leq 90°$. The point at $Alt=90°$ (i.e. directly overhead) is referred to as the zenith. Az has a range of $0° \leq Az \leq 360°$ and represents the true compass heading toward the point on the horizon lying directly below the object of interest. Az is measured eastwardly from North (i.e. $North=0°$; $East=90°$; $South=180°$; and $West=270°$).

One characteristic of telescope systems employing alt-az mounts is that every observer location on Earth has its own unique alt-az coordinate system. That is, the alt-az coordinates of particular celestial objects depend on the observer location. Accordingly, telescope users do not typically use alt-az coordinates to share information about the location of celestial objects.

Instead, telescope users typically describe the location of celestial objects in celestial coordinates. Celestial coordinates may also be referred to as "polar coordinates" or "equatorial coordinates" and are based on the notion of a celestial sphere centered at the Earth and having an undefined radius. Celestial coordinates describe the angular position of a celestial object on the celestial sphere in a manner that is independent of the observer location.

Celestial coordinates are expressed in degrees of declination (DEC) and hours of right ascension (RA). DEC represents a projection of the Earth's terrestrial latitude onto the celestial sphere. DEC has a range of $-90° \leq DEC \leq 90°$, where $0°$ is the projection of the Earth's equator (referred to as the "celestial equator") and $\pm 90°$ are the projections of the axis about which the Earth rotates (referred to as the "celestial poles"). RA is defined by longitudinal lines (referred to as "hour circles"), which intersect the North and South celestial poles. Unlike the earth's lines of longitude, the hour circles of RA remain fixed on the celestial sphere. RA is normally expressed in hours, minutes and seconds and has a range of $0$ hours $\leq RA \leq 24$ hours, where 1 hour=$15°$. $RA=0$ hours has been arbitrarily assigned to be the hour circle coinciding with the projection of the Earth's vernal (spring) equinox on the celestial sphere. RA increases in an eastward direction until it returns to 24 hours at the hour circle coinciding with the projection of the Earth's vernal equinox again.

The Earth is continually rotating about its axis. Consequently, even though celestial coordinates are capable of describing the position of a celestial object in a manner that is independent of the observer location, orientation information relating to the location of the observer on the surface of the earth is still required in order use the celestial coordinates of the object to capture the object in the field of view of a telescope. This orientation information may include a variety of parameters which effectively specify the instantaneous orientation of the observer location (which is moving as the earth rotates) with respect to the celestial coordinate system. Typically, this orientation information includes the latitude of the observer location and the instantaneous sidereal time at the observer location. However, other mathematically equivalent forms of orientation information may also be used for this purpose.

This orientation information, which specifies the instantaneous orientation of the observer location with respect to the celestial coordinate system may also be used to formulate a transformation between the celestial coordinate system and a local alt-az coordinate system at the observer location. Such a transformation may transform the coordinates of a celestial object from the celestial coordinate system to the local alt-az coordinate system and may thereby determine the instantaneous latitude and azimuthal angles at which the respective axes of an alt-az mount must be set in order to capture the celestial object in the telescope field of view.

Celestial objects viewed through a telescope appear to move through the sky. This apparent movement of celestial objects is principally due to the rotation of the Earth about its axis. There are other factors (e.g. the motion of the Earth around the sun and the motion of an object itself), which cause the object to appear to move through the sky, but these factors are usually very small over the course of an observing session. Accordingly, after locating a desired celestial object, the orientation of a telescope must be continually adjusted in order to maintain the object in the telescope field of view. Continual adjustment of a telescope orientation to maintain a desired celestial object in the telescope field of view is referred to as "tracking" an object.

Several telescope systems have been proposed for automatically tracking celestial objects. Baun et al. disclose a telescope system having an alt-az mount capable of automatically tracking celestial objects in a series of patents and patent publications, which include:

U.S. Pat. No. 6,304,376;
U.S. Pat. No. 6,392,799;
US Patent Publication No. U.S. 2003/0156324;
US Patent Publication No. U.S. 2004/0047036; and
US Patent Publication No. U.S. 2003/0197930.

The Baun et al. system makes use of an initialization procedure during which the telescope tube is first pointed north and then leveled to obtain "initial directional inputs". The Baun et al. initialization procedure may be further refined by initially inputting geographical location indicia, or by directing the telescope at one or two additional celestial objects. Once initialized, a command processor, under application software program control, uses the initial directional inputs and adjusts the alt-az axes of the telescope system to orient the telescope with respect to the celestial coordinate system. The command processor is capable of adjusting the alt-az axes to automatically track a desired celestial object.

The "initial directional inputs" referred to by Baun et al. represent the orientation information necessary to specify the instantaneous orientation of the observer location with respect to the celestial coordinate system and to transform the celestial coordinates of a desired celestial object into a local alt-az coordinate system at the observer location. In accordance with a first initialization procedure disclosed by Baun et al., a user is required to enter: (i) the current date at the observer location; (ii) the current time at the observer location; (iii) whether there is daylight savings at the observer location; and (iv) the country, state and city or geographical landmark closest to the observer location. For the purposes of implementing this first initialization procedure, the Baun et al. system retains a library of cities and geographical landmarks and their corresponding latitude and longitude information.

This initialization procedure requires a user to input a relatively large amount of information during the initialization procedure, prior to using the telescope. Inputting such a large amount of information is cumbersome and requires sophisticated (and correspondingly expensive) input devices, such as alphanumeric keypads and the like. In addition, the memory associated with the library of cities and geographical landmarks tends to make the Baun et al. system expensive. These expensive features of the Baun et al. systems are often prohibitive for consumer telescopes directed at amateur astronomers. Furthermore, the user may not have access to one or more of the required pieces of information, such as the local time at the observer location for example and may consequently be unable to operate the autotracking aspects of the Baun et al. system. Baun et al. disclose that this initialization procedure may be performed by incorporating a GPS system and obtaining the local time and the latitude and longitude of the observer location from the GPS. However, GPS systems are also relatively expensive, particularly for consumer telescope systems.

Baun et al. also disclose an orientation methodology wherein: (i) a user points the telescope tube North and then depresses a function key; (ii) the user levels the telescope and then depresses a function key; (iii) the system uses the time and date information input by the user in the above-described initialization procedure to select a celestial object from a database of known celestial objects and to slew the telescope to the vicinity of the selected celestial object; and (iv) the user centers the celestial object in the telescope field of view and then depresses a function key. Baun et al. also disclose that steps (iii) and (iv) of this orientation methodology may be repeated to improve the orientation accuracy. For the purposes of implementing this orientation methodology, the Baun et al. system retains a library of celestial objects and their associated celestial coordinates.

This orientation methodology suffers from a number of disadvantages. Like the initialization procedure described above, this orientation methodology requires that the user perform a large number of steps prior to using the telescope. Moreover, the user is still required to enter the local date and time information described in the initialization procedure. Inputting such information is cumbersome and requires sophisticated (and correspondingly expensive) input devices. The requirement that the user center one or more celestial objects in the field of view of the telescope is only feasible at night time and where there are relatively few clouds in the sky (i.e. when the celestial object(s) are clearly visible). In addition, even though the Baun et al. system selects a celestial object from a database of known celestial objects and slews the telescope to the vicinity of the selected celestial object, the selected celestial object is not likely to be perfectly centered and there are likely be other celestial objects in the field of view. Inexperienced telescope users may have difficulty determining which of the celestial objects in the field of view is the one selected by the Baun et al. system and, consequently, may center the wrong celestial object in the field of view, thereby providing the system with erroneous initial directional inputs. Furthermore, the memory associated with the database of celestial objects and their corresponding celestial coordinates adds to the expense of the Baun et al. system.

Baun et al. also disclose a tracking procedure wherein: (i) a user indicates to the system whether the observer location is in the Northern or Southern hemisphere by setting a hemisphere control switch; (ii) the user then points the telescope tube at the celestial pole (which may be approximated by Polaris in the Northern hemisphere) and depresses a set of push buttons; (iii) the then user levels the telescope tube with the horizon and depresses a set of push buttons; (iv) the system determines an approximation of the observer latitude from the difference in the altitude coordinates of the celestial pole and the horizon; and (v) the system determines a zero reference point for the azimuthal axis from when the telescope tube was pointed at the celestial pole. Baun et al. suggest that with this information, the telescope system is capable of tracking a celestial object once the object is placed in its field of view.

This tracking procedure requires the user to point the telescope at the celestial pole. This is difficult for users who are not familiar with the celestial coordinate system and for users who may not be able to identify Polaris in the night sky. Although, Polaris is close to the celestial pole and may be used as an approximation for the celestial pole in the Northern hemisphere, there is no easily observable celestial object that is close to the celestial pole in the Southern hemisphere. In addition, the requirement of pointing the telescope at Polaris is only feasible at night time and where there are relatively few clouds in the sky (i.e. when Polaris is clearly visible).

In addition to all of the aforementioned disadvantages, the systems disclosed by Baun et al. are expensive to produce, as they require expensive controllers, expensive memory components, sophisticated control software and expensive user interfaces which include their own communication hardware and software.

There is a general desire to provide telescope systems having automatic tracking alt-az mounts that overcome or at least ameliorate some of the aforementioned disadvantages.

BRIEF DESCRIPTION OF THE DRAWINGS

In drawings which depict non-limiting embodiments of the invention.

SUMMARY OF THE INVENTION

Figure 1:
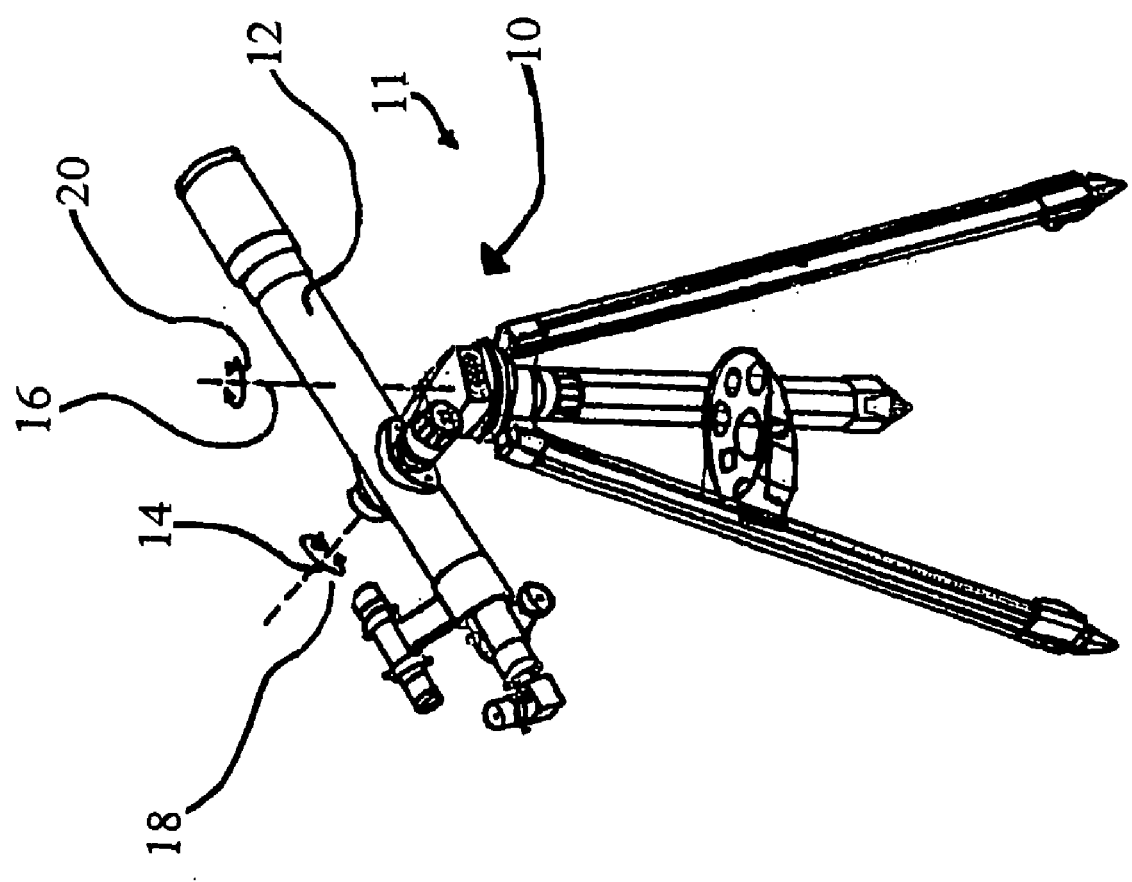
FIG. 1 is an isometric view of a prior art telescope system incorporating an alt-az mount.

A first aspect of the invention provides a method for calibrating an alt-az telescope system with a latitude of an observer location. The telescope system comprises: a telescope tube mounted for pivotal motion about altitude and azimuthal axes; and a latitude indicator coupled to a corresponding one of the altitude and azimuthal axes, the latitude indicator indicating a latitude value which varies with movement of the telescope tube about the corresponding axis. The method involves obtaining information indicative of a first angular position of the telescope tube about the corresponding axis, wherein at the first angular position, the latitude indicator indicates a first latitude value. The orientation of the telescope tube is then adjusted about the corresponding axis to a second angular position, wherein at the second angular position the latitude indicator indicates a second latitude value that differs from the first latitude value by an amount corresponding to the observer latitude. The method then involves subtracting the information indicative of the first angular position from information indicative of the second angular position to determine a difference value, the difference value indicative of the latitude of the observer location.

The latitude indicator may comprise a dial-type latitude indicator comprising latitude indicia that indicate latitude values and a pointer element, the latitude indicia and the pointer element moveable relative to one another with movement of the telescope tube about the corresponding axis. When the telescope tube is in the first angular position, the pointer element may point at one of the latitude indicia which indicates the first latitude value. When the telescope tube is in the second angular position, the pointer element may point at one of the latitude indicia which indicates the second latitude value.

Obtaining the information indicative of the first angular position may comprise obtaining an encoder count value from an encoder coupled to the corresponding axis. The method may involve obtaining the information indicative of the second angular position from the encoder.

The method may involve prior to adjusting the orientation of the telescope tube, physically recalibrating the dial-type latitude indicator, such that the pointer element points at one of the latitude indicia which indicates zero degrees latitude and the first latitude value is zero degrees latitude.

The difference value may be stored in memory as a system representation of the observer latitude. The difference value may be processed to obtain trigonometric functions of the observer latitude and storing the trigonometric functions of the observer latitude. Processing the difference value may comprise at least one of: scaling the difference value and subtracting an offset from the difference value. The trigonometric functions of the observer latitude may be obtained from a look up table stored in memory.

Adjusting an orientation of the telescope tube comprises controllably actuating a motor coupled to the corresponding axis.

The method may comprise, prior to obtaining the information indicative of the first angular position, adjusting an orientation of the telescope tube to an orientation wherein altitude and azimuthal coordinates of the telescope tube are both zero and recalibrating system representations of the altitude and azimuthal coordinates when the telescope tube is in the orientation wherein the altitude and azimuthal coordinates of the telescope tube are both zero.

The corresponding axis may be the altitude axis or the azimuthal axis.

The latitude indicator may comprise an electronic-type latitude indicator having a display which indicates latitude values. The method may comprise, prior to adjusting the orientation of the telescope tube, electronically recalibrating the latitude indicator such that the display indicates zero degrees latitude and the first latitude value is zero degrees latitude.

The difference value may be scalable by a linear scaling factor to obtain an actual observer latitude or the difference value may be related to an actual observer latitude by a non-linear mathematical relationship.

Another aspect of the invention provides a telescope system comprising a mount for supporting a telescope tube. The mount has altitude and azimuthal pivot joints configured to pivot the telescope tube about its altitude and azimuthal axes and corresponding altitude and azimuthal encoders connected to detect information indicative of angular positions of the telescope tube about its altitude and azimuthal axes. A latitude indicator is coupled to a corresponding one of the altitude and azimuthal pivot joints, the latitude indicator indicating a latitude value which varies with movement of the corresponding pivot joint. A controller is connected to the altitude and azimuthal encoders so as to receive angular position information from the encoders. The controller is configured to determine a difference value between angular position information from the encoder associated with the corresponding pivot joint at first and second angular positions, the difference value indicative of a latitude of an observer location when the first and second angular positions are selected such that a difference in the latitude information indicated by the latitude indicator at the first and second angular positions corresponds to the observer latitude.

Another aspect of the invention provides a method for entering a latitude value into a telescope control system. The telescope system comprises: a telescope tube mounted for pivotal motion about altitude and azimuthal axes; a latitude indicator coupled to a corresponding one of the altitude and azimuthal axes, the latitude indicator indicating a latitude value which varies with movement of the telescope tube about the corresponding axis; and an encoder coupled to the corresponding axis, the encoder producing an encoder signal indicating an angular position of the telescope tube about the corresponding axis. The method involves obtaining a first angular position of the telescope tube about the corresponding axis from the encoder signal, wherein at the first angular position, the latitude indicator indicates a first latitude value; adjusting an orientation of the telescope tube about the corresponding axis to a second angular position, wherein at the second angular position, the latitude indicator indicates a second latitude value that differs from the first latitude value by an amount corresponding to the observer latitude; obtaining the second angular position of the telescope tube about the corresponding axis from the encoder signal; and subtracting the first angular position from the second angular position to determine a difference value, the difference value indicative of the latitude of the observer location.

Another aspect of the invention provides a method for calibrating an alt-az telescope system with a latitude of an observer location. The telescope system comprises: a telescope tube mounted for pivotal motion about altitude and azimuthal axes; a latitude indicator coupled to a corresponding one of the altitude and azimuthal axes, the latitude indicator indicating a latitude value which varies with movement of the telescope tube about the corresponding axis; and a sensor coupled to the corresponding axis for providing a sensor output signal which varies with movement of the telescope tube about the corresponding axis. The method involves: adjusting an orientation of the telescope tube about the corresponding axis to a first angular position where the latitude indicator reads a latitude value corresponding to the observer latitude; receiving the sensor output signal when the telescope tube is in the first angular position; and determining a system representation of the observer latitude based on the received sensor output signal.

Further aspects and specific features and applications of specific embodiments of the invention are described below.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 2A:
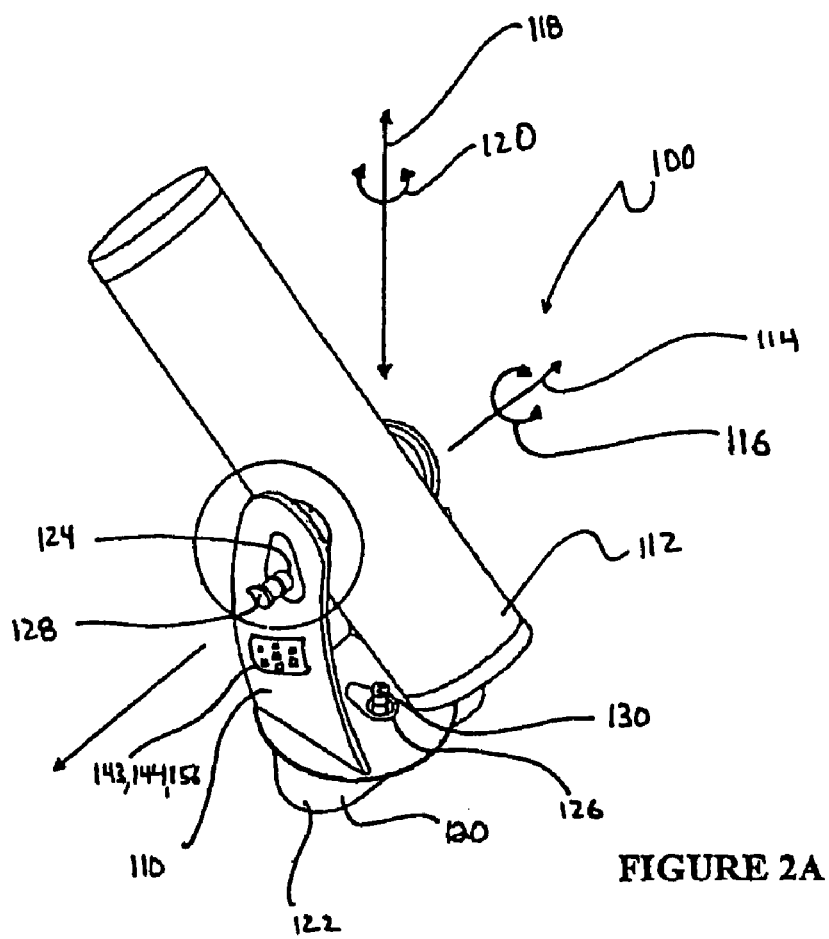
FIG. 2A is an isometric view of a telescope system according to a particular embodiment of the invention.

FIG. 2A depicts a telescope system 100 according to a particular embodiment of the invention. In the FIG. 2A embodiment, telescope system 100 is a Dobsonian telescope system having a telescope tube 112 supported by an alt-az mount 110. Mount 110 may comprise a base 120 having legs 122 or similar supports. In Dobsonian telescope systems such as telescope system 100 of FIG. 2A, alt-az mount 110 is typically mounted directly on a floor or table or similarly flat surface. In alternative embodiments, alt-az mount 110 may comprise other components for supporting the telescope system away from the floor and/or on other surfaces, such as shelves or windowsills for example.

As shown in FIG. 2A, mount 110 comprises an altitude pivot joint 124 for pivoting telescope tube 112 about a horizontal altitude axis 114 (i.e. in either direction of double-headed arrow 116) and an azimuthal pivot joint 126 for pivoting telescope tube 112 about its vertical azimuthal axis 118 (i.e. in either direction of double-headed arrow 120). A motor 128 is operationally coupled (though a suitable drive train (not shown)) to altitude pivot joint 124, such that rotational motion of the shaft of motor 128 causes pivotal motion of altitude joint 124 and corresponding pivotal motion of telescope tube 112 about altitude axis 114. Motor 130 may be similarly coupled to azimuthal pivot joint 126 to cause pivotal motion of azimuthal joint 126 and corresponding pivotal motion of telescope tube 112 about azimuthal axis 118. In some embodiments, motors 126, 128 comprise servo motors. However, motors 126, 128 may generally comprise any type of electronically controllable motor, including stepper motors, or other types of AC or DC motors, for example. Motors 126, 128 may be provided with their own internal gearing mechanisms.

Figure 3:
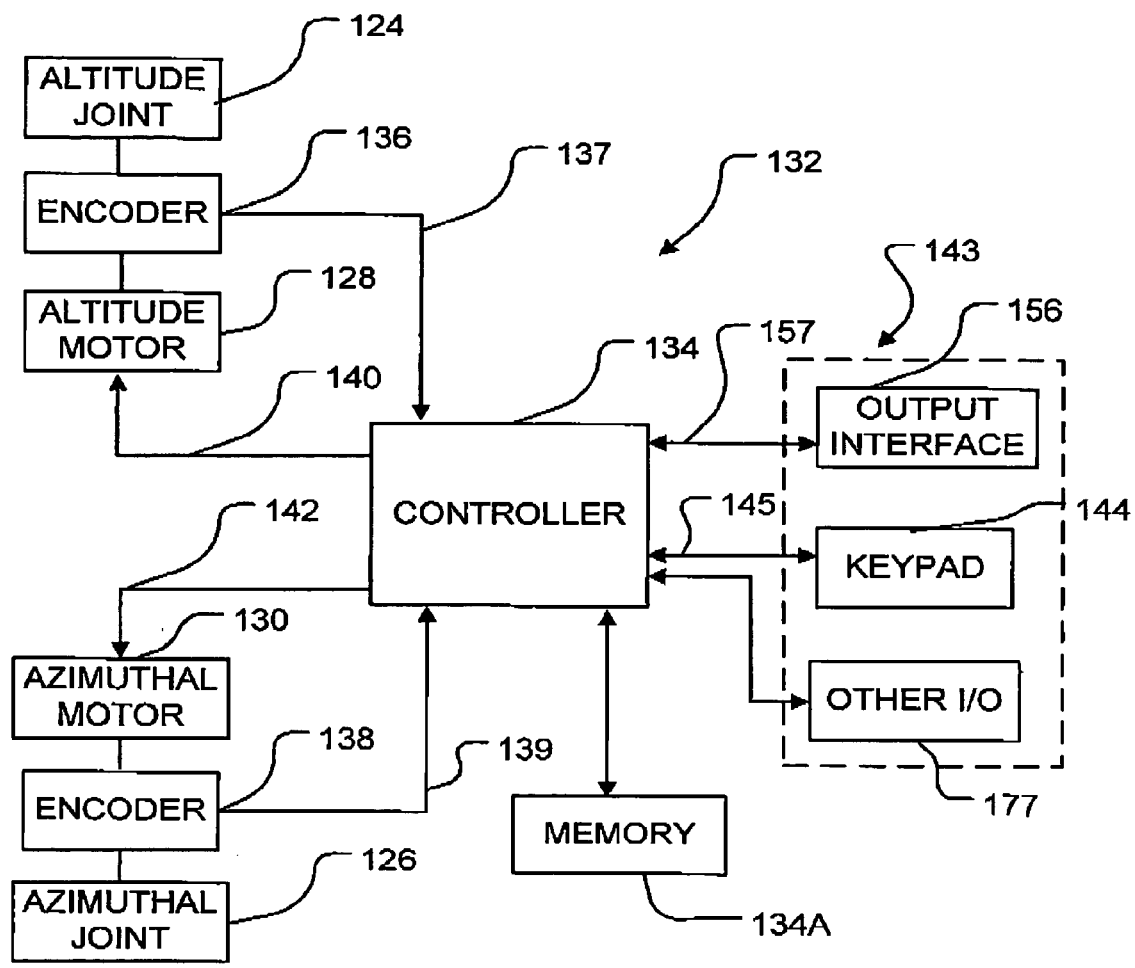
FIG. 3 is a schematic representation of a control system that may be used in the telescope system of FIG. 2A.

FIG. 3 is a schematic block diagram of a control system 132 for operating telescope system 100. Control system 132 includes a controller 134. Controller 134 may be embodied by a wide variety of components. For example, controller 134 may comprise one or more programmable processor(s) which may include, without limitation, embedded microprocessors, dedicated computers, groups of data processors or the like. Some functions of controller 134 may be implemented in software, while others may be implemented with specific hardware devices. The operation of controller 134 may be governed by appropriate firmware/code residing and executing therein, as is well known in the art. Controller 134 may comprise memory or have access to external memory. In the FIG. 3 embodiment, controller 134 has access to external memory 134A.

Altitude encoder 136 is operationally coupled to motor 128 and/or altitude pivot joint 124 to sense information indicative of the angular position of telescope tube 112 with respect to altitude axis 114. Altitude encoder 136 provides this angular position information to controller 134 via signal 137. Altitude encoder 136 may be an optical encoder for example. A similar azimuthal encoder 138 is operationally coupled to motor 130 and/or azimuthal pivot joint 126 to sense information indicative of the angular position of telescope tube 112 with respect to azimuthal axis 118. Azimuthal encoder 138 provides this angular position information to controller 134 via signal 139. Those skilled in the art will appreciate that the angular position information sensed by encoders 136, 138 is related to the altitude and azimuthal coordinates of telescope tube 112.

Encoders 136, 138 may be capable of sensing a minimum of 2 encoder counts per degree of angular rotation of telescope tube 112 about their respective altitude and azimuthal axes 114, 118. However, in preferred embodiments, encoders 136, 138 are capable of sensing over 50 or even over 100 encoder counts per degree of angular rotation of telescope tube 112 about their respective altitude and azimuthal axes 114, 118. Those skilled in the art will appreciate that less accurate encoders (i.e. with a smaller number of encoder counts per degree) may be less expensive and may enable the use of less expensive processors. However, there is a tradeoff, because the smoothness of the controlled movement of motors 128, 130 and the smoothness of the corresponding movement of telescope tube 112 increase with encoder accuracy.

While encoders 136, 138 are described as sensing the angular positions of telescope tube 112 about its altitude and azimuthal axes 114, 118, those skilled in the art will appreciate that encoders 136, 138 may equivalently be configured to sense the angular position of the shafts of motors 128, 130 and/or the angular position of altitude and azimuthal pivot joints 124, 126. Controller 134 may be programmed or otherwise configured with a model of the mechanical system representing the relationship between the angular position information measured by encoders 136, 138 and the angular positions of telescope tube 112 about its altitude and azimuthal axes 114, 118.

Controller 134 is capable of using the angular position information received from encoders 136, 138 via signals 137, 139 to generate motor control signals 140, 142. Controller 134 may use control signals 140, 142 to respectively control motors 128, 130 and to thereby control the angular positions of telescope tube 112 with respect to its altitude and azimuthal axes 114, 118. As discussed above, the angular positions of telescope tube 112 with respect to its altitude and azimuthal axes 114, 118 are related to the altitude and azimuthal coordinates of telescope tube 112. Accordingly, the concepts of the altitude coordinate of telescope tube 112 and the angular position of telescope tube 112 about is altitude axis 114 are used interchangeably in this description and the concepts of the azimuthal coordinate of telescope tube 112 and the angular position of telescope tube 112 about its azimuthal axis 118 are used interchangeably in this description.

Those skilled in the art will appreciate that each motor control signal 140, 142 (schematically depicted as a single line in FIG. 3) may comprise a plurality of signals and a corresponding plurality of physical and/or wireless connections for driving motors 128, 130 in either direction. Similarly, other signals and connections schematically depicted as single lines in FIG. 3 may comprise a plurality of signals and a corresponding plurality of physical and/or wireless connections.

In some embodiments, motor control signals 140, 142 are pulse width modulation (PWM) signals. Controller 134 is preferably sufficiently fast to control the simultaneous operation of motors 128, 130. In some embodiments, controller 134 uses time division multiplexing techniques to control the simultaneous operation of motors 128, 130. The use of encoders to sense angular position information relating to a motor shaft (and/or a telescope axis) and corresponding control of the motor to achieve a desired angular position of the motor shaft (and/or the telescope tube) is well known in the art.

Figure 4:
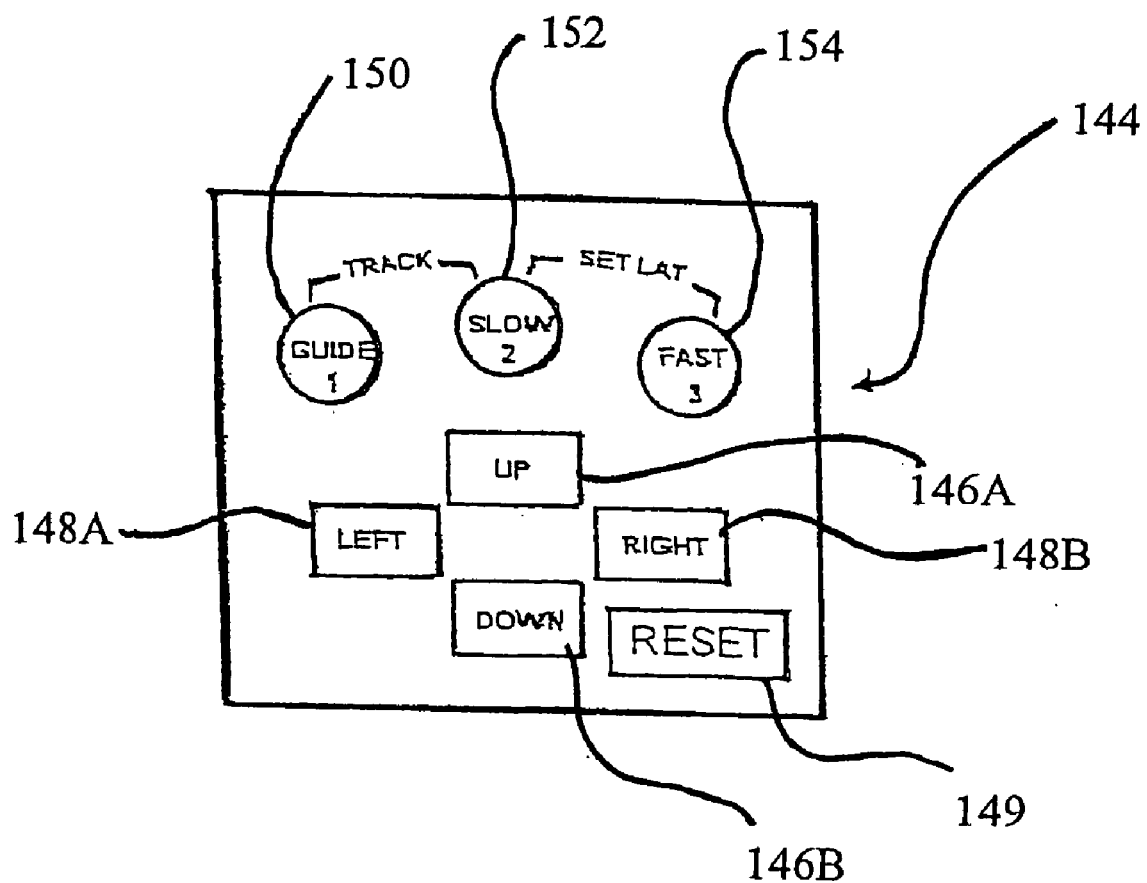
FIG. 4 is a schematic representation of an operational keypad that may be used in the telescope system of FIG. 2A.

Telescope system 100 and control system 132 comprise a user interface 143. In the FIG. 1 embodiment, user interface 143 is located on mount 110. In alternative embodiments, user interface 143 may be remote from telescope tube 112 and mount 110 and may communicate with local components of telescope system 100 using wired and/or wireless communications. In the FIG. 3 embodiment, user interface 143 comprises an operational keypad 144. FIG. 4 depicts an operational keypad 144 according to a particular embodiment of the invention. Keypad 144 may be manipulated by a user to control telescope system 100. In the FIG. 4 embodiment, operational keypad 144 comprises a pair of user inputs 146A, 146B for adjustment of the angular position of telescope tube 112 about altitude axis 114 and a pair of user inputs 148A, 148B for adjustment of the angular position of telescope tube 112 about azimuthal axis 118.

When a user activates input 146A, controller 134 receives an input signal 145 (FIG. 3) indicating that it is desired to increase the angular position of telescope tube 112 about its altitude axis 114. Based on this input signal 145, controller 134 creates a motor control signal 140 which controllably drives altitude motor 128 to increase the angular position of telescope tube 112 about its altitude axis 114. Similarly, a user may activate input 146B to decrease the angular position of telescope tube 112 about its altitude axis 114 and inputs 148A, 148B to move telescope tube in either angular direction about its azimuthal axis 118.

In the FIG. 4 embodiment, keypad 144 comprises three additional inputs 150, 152, 154. A user may activate inputs 150, 152, 154 to control the speed with which motors 128, 130 move in response to user inputs 146A, 146B, 148A, 148B. For example: activating input 150 may cause controller 134 to output motor control signals 140, 142 which drive motors 128, 130 at a relatively low speed; activating input 152 may cause controller 134 to output motor control signals 140, 142 which drive motors 128, 130 at a moderate speed; and activating input 154 may cause controller 134 to output motor control signals 140, 142 which drive motors 128, 130 at a relatively high speed. Controller 134 may comprise or may otherwise have access to memory 134A for storing the most recently activated one of inputs 150, 152, 154. In the FIG. 4 embodiment, keypad 144 also comprises a reset input 149 which is explained further below.

Figure 5:
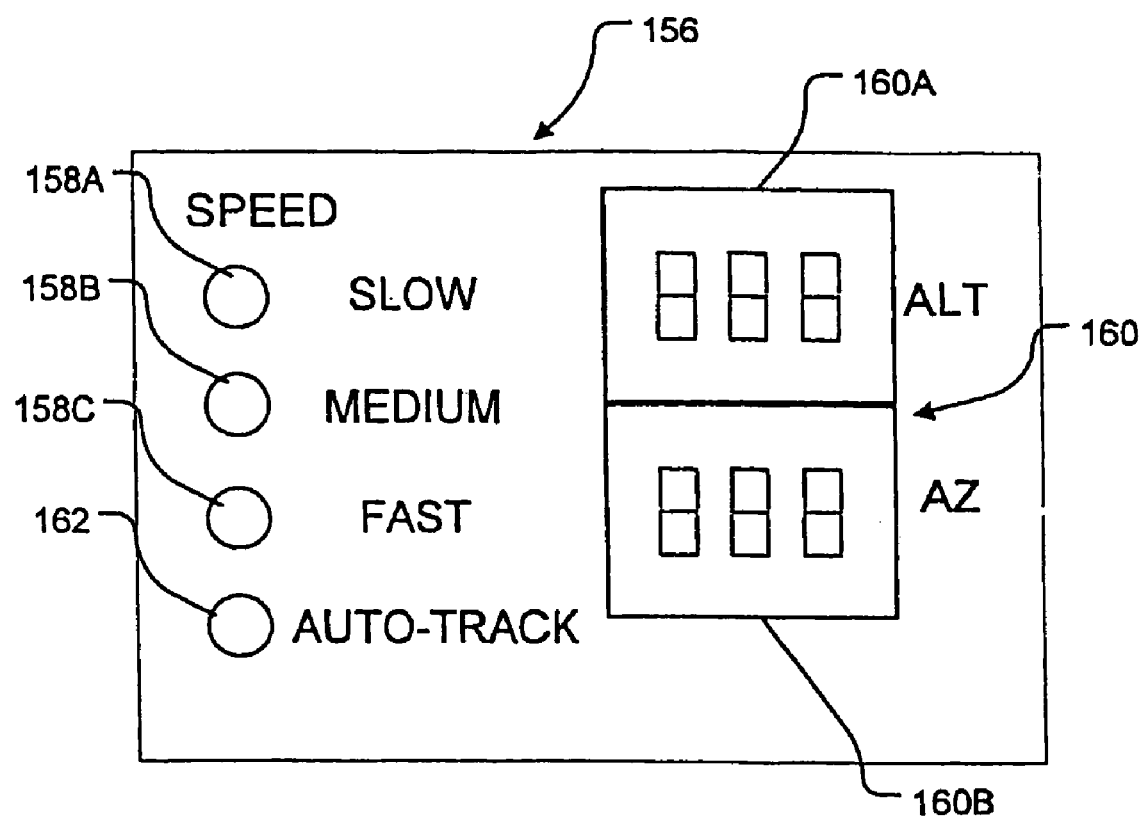
FIG. 5 is a schematic representation of an output interface that may be used in the telescope system of FIG. 2B.

In the FIG. 3 embodiment, user interface 143 also comprises an output interface 156. FIG. 5 depicts an output interface 156 according to a particular embodiment of the invention. In the FIG. 5 embodiment, output interface 156 comprises a plurality of LED's (or other output indicators) 158A, 158B, 158C, which provide an indication of the most recently activated one of user inputs 150, 152, 154 (see FIG. 4). For example, if input 150 was the most recently activated one of user inputs 150, 152, 154, then controller 134 may output a signal 157 (FIG. 3) which causes LED 158A to be on. LED 158A indicates that telescope system 100 is in its slow speed operational mode and that if a user activated one of inputs 146A, 146B, 148A, 148B, then controller 134 would cause relatively slow movement of motors 128, 130 and correspondingly slow movement of telescope tube 112. LED's 158B, 158C may be similarly used by controller 134 to indicate that telescope system 100 is in its moderate speed or high speed operational mode.

In the FIG. 5 embodiment, output interface 156 comprises an optional output display 160. Portion 160A of output display 160 may be used by controller 134 to display the current altitude coordinate of telescope tube 112 (i.e. the current value of the altitude coordinate of telescope tube 112 according to controller 134). Similarly, controller 134 may cause portion 160B of output device 160 to display the current azimuthal coordinate of telescope tube 112 (i.e. the current value of the azimuthal coordinate of telescope tube 112 according to controller 134). Determining system altitude and azimuthal coordinates to display on output device 160 may involve scaling, offsetting and/or otherwise processing the system representations of the altitude and azimuthal coordinates.

Telescope system 100 is capable of automatically tracking a celestial object of interest. In one particular embodiment, a user indicates that he or she would like telescope system to begin automatically tracking a desired celestial object by simultaneously activating user inputs 150 and 152 (see FIG. 4). Automatically tracking a celestial object involves moving telescope tube 112 in a manner which tracks the apparent movement of the desired celestial object to keep the object in the telescope field of view. In telescope system 100, which comprises alt-az mount 110, tracking a celestial object typically involves simultaneous movement of telescope tube 112 about its altitude and azimuthal axes 114, 118. Output interface 156 may comprise an auto-track LED 162 which is actuated by controller 134 when telescope system 100 is auto-tracking a celestial object.

If a user locates a celestial object in the field of view of telescope system 100 and provides an indication that he or she wants to track the object (e.g. by simultaneously activating user inputs 150, 152), then controller 134 uses the well known alt-az tracking equations to determine rate of change of the altitude and azimuthal coordinates of the object (and the corresponding altitude and azimuthal coordinates of the telescope tube 112).

The alt-az tracking equations may be expressed as:

$$\frac{\partial (Az)}{\partial t} = V_s[\sin(Lat) - \tan(Alt)\cos(Az)\cos(Lat)] \quad (1)$$

$$\frac{\partial (Alt)}{\partial t} = V_s[\sin(Az)\cos(Lat)], \quad (2)$$

where: Az represents the azimuthal coordinate (measured in degrees eastward from North); Alt represents the altitude coordinate (measured in degrees upward from the horizon); $V_s$ is the sidereal rate (i.e. the rate (in degrees/s) at which stars move from east to west across the sky due to the rotation of the Earth); and Lat is the latitude of the observer location measured in degrees (positive for the Northern hemisphere and negative for the Southern hemisphere).

Using the rate of change of the altitude and azimuthal coordinates determined from the alt-az tracking equations, controller 134 outputs the necessary motor control signals 140, 142 to adjust angular positions of telescope tube 112 with respect to its altitude and azimuthal axes 114, 118, such that telescope tube 112 tracks the changing altitude and azimuthal coordinates and thereby automatically tracks the desired object. In some embodiments, controller 134 tracks the desired rate of change of the altitude and azimuthal coordinates by determining the desired rate of change of the altitude and azimuthal coordinates of telescope tube 112 and outputting the necessary motor control signals 140, 142 to get telescope tube 112 to move at the desired rates about its altitude and azimuthal axes 114, 118. In other embodiments, controller 134 tracks the desired altitude and azimuthal coordinates themselves (i.e. rather than their rates of change) by using the alt-az tracking equations to determine desired altitude and azimuthal coordinates of telescope tube 112 and then outputting the necessary motor control signals 140, 142 to cause telescope tube 112 to move to the desired positions about is altitude and azimuthal axes 114, 118.

In preferred embodiments of the invention, controller 134 uses trigonometric look up tables to perform the calculations involved in evaluating the alt-az tracking equations and in performing control calculations involving the alt-az tracking equations. Such trigonometric lookup tables may be stored in memory 134A which is accessible to controller 134. The use of trigonometric lookup tables is well known in the art of control system design.

In order to determine the desired rate of change of the altitude and azimuthal coordinates and/or to determine the desired coordinates for telescope tube 112 using the alt-az tracking equations, controller 134 requires certain calibration information. The calibration information required by controller 134 to make use of the alt-az equations may include: calibration information relating to the altitude coordinate (Alt) of telescope tube 112; calibration information relating to the azimuthal coordinate (Az) of telescope tube 112 and calibration information relating to the latitude of the observer location (Lat). This calibration information may be provided to controller 134 in a calibration procedure.

Figures 6, 6A, 6B:
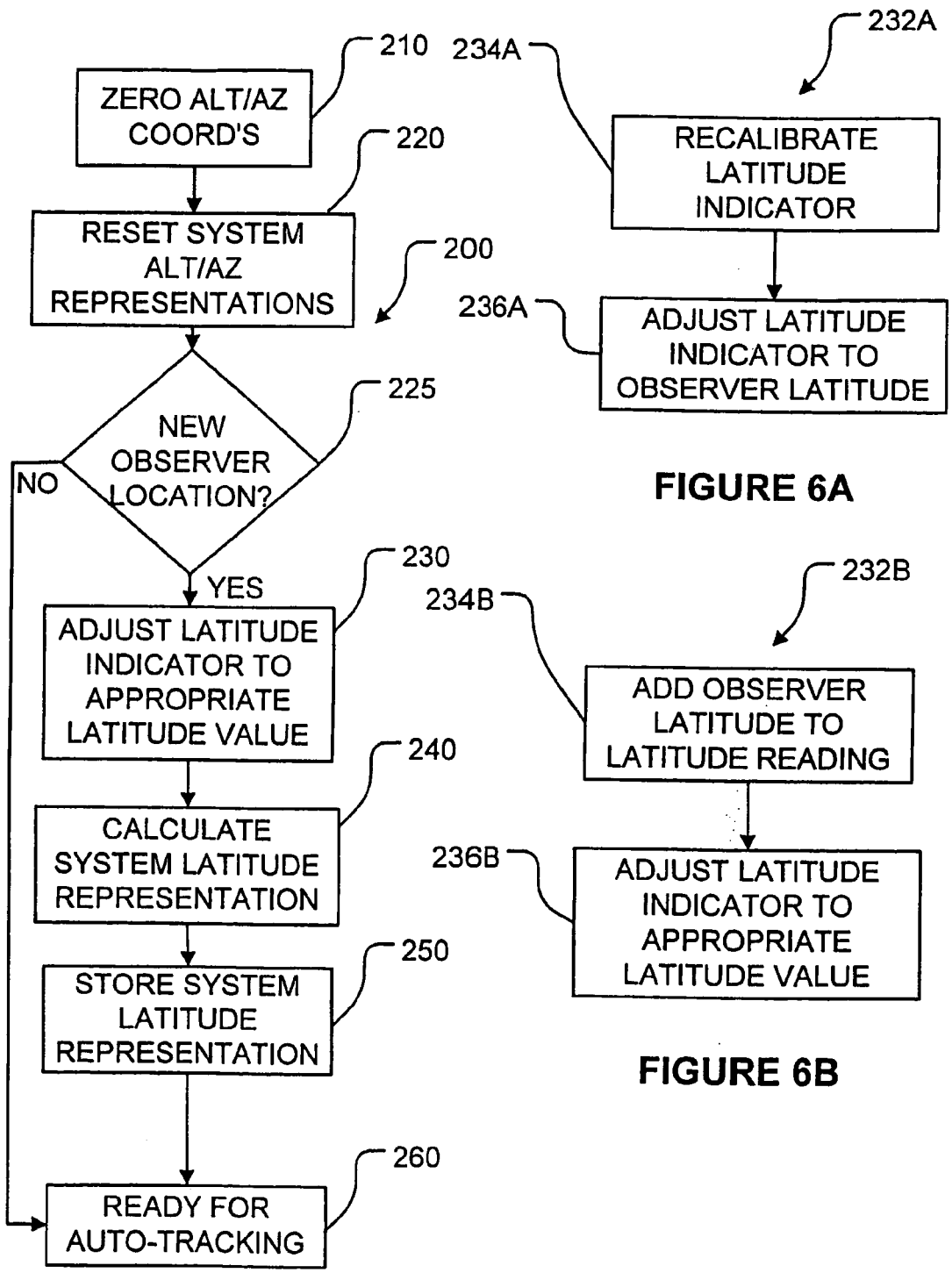
FIG. 6 is a schematic representation of a calibration procedure for the telescope system of FIG. 2A in accordance with a particular embodiment of the invention.
FIG. 6A is a schematic representation of a procedure for setting the latitude indicator which may form part of the FIG. 6 calibration procedure.
FIG. 6B is a schematic representation of a procedure for setting the latitude indicator which may form part of the FIG. 6 calibration procedure.

FIG. 6 depicts a calibration procedure 200 according to a particular embodiment of the invention. Calibration procedure 200 provides controller 134 with calibration information related to the altitude coordinate (Alt) of telescope tube 112, calibration information related to the azimuthal coordinate (Az) of telescope tube 112 and calibration information related to the latitude of the observer location (Lat).

Calibration procedure 200 begins in block 210, where a user uses keypad 144 to zero the altitude and azimuthal coordinates of telescope tube 112. Zeroing the altitude and azimuthal coordinates of telescope tube 112 is equivalent to leveling telescope tube 112 (i.e. pointing it at the horizon) and pointing telescope tube 112 northward. In some embodiments, telescope tube 112 comprises a magnetic and/or electronic compass (not shown) capable of assisting the user to determine when telescope tube 112 is pointed northward. In some embodiments, telescope tube 112 comprises one or more liquid level indicators (not shown) capable of assisting the user to determine when telescope tube 112 is pointed at the horizon.

In block 220 of the illustrated embodiment, after the altitude and azimuthal coordinates are both zeroed in block 210, controller 134 recalibrates the system representations of the altitude and azimuthal coordinates (i.e. the values of the altitude and azimuthal coordinates according to controller 134) to be zero. This block 220 recalibration may be accomplished by the user activating reset input 149 (see FIG. 4) or some other combination of inputs, for example. Controller 134 may associate the block 220 values of altitude encoder 136 and azimuthal encoder 138 with altitude and azimuthal coordinates of zero, such that any count generated by encoder 136 or encoder 138 represents a movement of the angular position of telescope tube 112 from the zero position.

In alternative embodiments, the FIG. 6 calibration method 200 may be implemented by independently zeroing and recalibrating the altitude and azimuthal coordinates in sequence. For example, the altitude axis may be zeroed (by leveling telescope tube 112) and then the system representation of the altitude coordinate can be recalibrated by pushing a certain user input (or combination of user inputs). The azimuthal axis may be subsequently zeroed (by orienting telescope tube 112 northward) and then the system representation of the azimuthal coordinate recalibrated by pushing a certain user input (or combination of user inputs).

Those skilled in the art will appreciate that the system representations of the altitude and azimuthal coordinates may be different than the actual altitude and azimuthal coordinates of telescope tube 112. The system representations of other variables, such as the observer latitude (discussed further below), may also be different than the actual latitude coordinate of the observer location. For example, the system representations of the altitude and azimuthal coordinates and/or observer latitude may be maintained (e.g. stored and/or processed) as encoder count values and/or differences between encoder count values.

In such circumstances, the altitude and azimuthal calibration information obtained in block 220 may comprise information used to determine relationships between the system representations of the altitude and azimuthal coordinates and the actual altitude and azimuthal coordinates of telescope tube 112. For example: the altitude calibration information may comprise information such as a zero offset parameter used in a mathematical relationship between the count of altitude encoder 136 and the actual altitude coordinate of telescope tube 112; and the azimuthal calibration information may comprise a zero offset parameter used in a mathematical relationship between the count of azimuthal encoder 138 and the actual altitude coordinate of telescope tube 112. Other information used in the mathematical relationships (such as relative scaling factors between the count of altitude and azimuthal encoders 136, 138 and the actual altitude and azimuthal coordinates of telescope tube 112 for example) may be known a priori by controller 134.

In some circumstances, the encoder count values (and/or differences in encoder count values) corresponding to the system representations of the altitude and azimuthal coordinates (and/or observer latitude) may be used directly for control calculations or other processing. In other circumstances, these encoder count values (and/or differences in encoder count values) corresponding to the system representations of the altitude and azimuthal coordinates (and/or observer latitude) may be scaled, offset and/or otherwise processed to express the altitude and azimuthal coordinates of telescope tube 112 (and/or observer latitude) in angular units, such as degrees or radians, prior to (or as a part of) performing control calculations or other processing.

In alternative embodiments, the system representations of the altitude and azimuthal coordinates (and/or the observer latitude) may be scaled, offset and/or processed prior to storage, such that the system representations are actually maintained in angular units, such as degrees or radians, which correspond to the altitude and azimuthal angular coordinates of telescope tube 112 (and/or the observer latitude).

In some embodiments, the system representations of certain information may be alternatively or additionally be maintained as trigonometric functions. For example, the observer latitude (explained further below) may be stored as trigonometric functions of the system latitude representation (e.g. the sine and cosine of the system latitude representation). Such information may be maintained in trigonometric lookup tables stored in memory 134A that is accessible to controller 134. Those skilled in the art will appreciate that all references to trigonometric functions in this description and the accompanying claims should be understood to include approximations of trigonometric functions to accommodate digital calculation. The use of trigonometric-look up tables is well known in the art of control system design.

Where this description describes storing, maintaining, obtaining, calculating, determining or otherwise processing particular information, such as the system representation of the azimuthal coordinate for example, such terms should be understood to include storing, maintaining, obtaining, calculating, determining or otherwise processing related information (e.g. trigonometric functions) from which the particular information may be obtained mathematically or otherwise.

Immediately after activating reset input 149 in block 220, the altitude and azimuthal coordinates of telescope tube 112 are zero. Accordingly, controller 134 may send appropriate signals 157 to output display 160 to show that telescope system 100 recognizes that both the altitude coordinate of telescope tube 112 (shown on display portion 160A) and azimuthal coordinate of telescope tube 112 (shown on display portion 160B) are zero. In subsequent operation (i.e. after block 220), controller 134 causes alphanumeric display 160 to display the altitude and azimuthal coordinates of telescope tube 112 relative to the zero coordinates obtained in block 220.

In block 225, a determination is made as to whether telescope system 100 is in a new observer location or not. The block 225 determination may be made by a user and/or in response to input from a user. Telescope system 100 may query the user as to whether it is located in a new observer location. Alternatively, telescope system 100 may operate in a default mode, where it assumes that it is in the same observer location as when it was last calibrated unless a user indicates otherwise. If telescope system 100 is not in a new observer location, then controller 134 is ready for auto-tracking and proceeds to block 260. If, on the other hand, telescope system 100 is in a new observer location, then calibration procedure 200 proceeds to block 230.

Figure 2B:
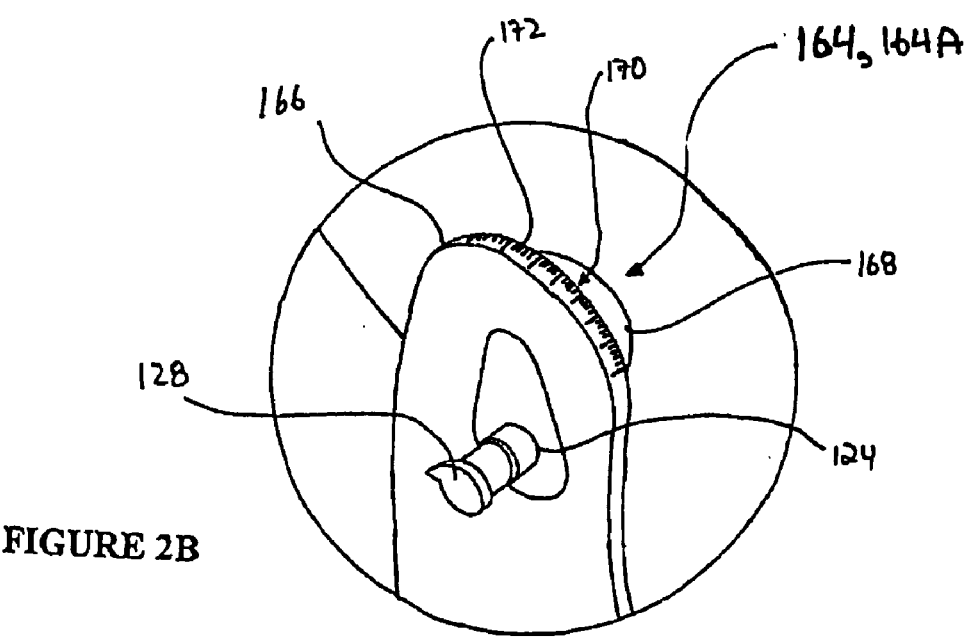
FIG. 2B is an isometric view of a dial-type latitude indicator of the FIG. 2A telescope system.
Figure 2C:
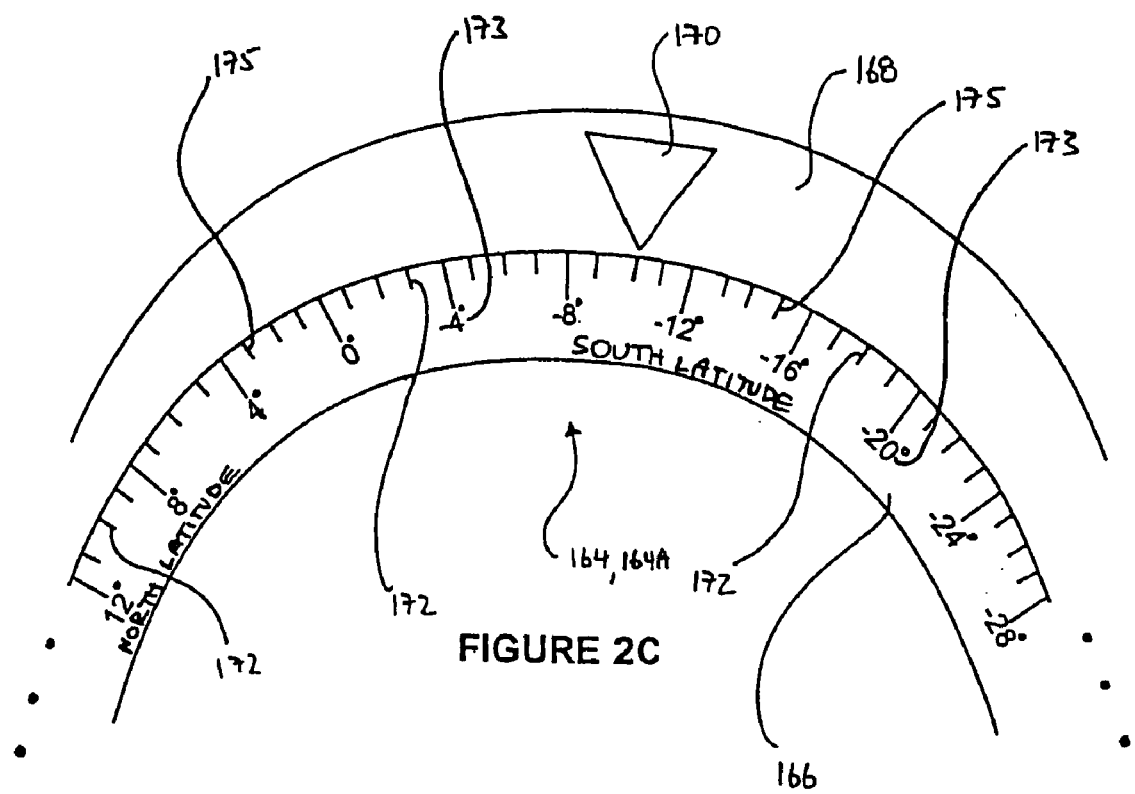
FIG. 2C is a partial schematic representation of the FIG. 2B dial-type latitude indicator.

In block 230, the user makes use of a latitude indicator 164 to provide controller 134 with information about the latitude of the observer location. FIGS. 2B and 2C show a latitude indicator 164 according to a particular embodiment of the invention. In the illustrated embodiment of FIG. 2B and the schematic representation of FIG. 2C, latitude indicator 164 comprises a dial-type latitude indicator 164A, which is coupled to altitude pivot joint 124. Dial-type latitude indicator 164A comprises a first portion 166 which is a part of mount 110. When pivot joint 124 moves (i.e. telescope tube 112 moves about its altitude axis 114), first portion 166 of dial-type latitude indicator 164A does not move. First portion 166 of dial-type latitude indicator 164A also comprises a number of angularly spaced apart latitude indicia 172 corresponding to latitudes on the surface of the Earth. Advantageously, latitude indicia 172 directly indicate latitude information (i.e. rather than, or in addition to, information about the altitude angle of telescope tube 112). For example, as shown in FIG. 2C, latitude indicia 172 may comprise numbers 173 and markings 175 which correspond to different latitudes. In preferred embodiments of the invention (as shown in FIG. 2C), latitude indicia 172 indicate south latitudes as negative numbers and north latitudes as positive numbers.

Dial-type indicator 164A comprises a second portion 168 which moves with telescope tube 112 when pivot joint 124 moves. Second portion 168 of dial-type latitude indicator 164A comprises a pointer element 170 which points at latitude indicia 172 on the first portion 166 of dial-type latitude indicator 164A. When pointer element 170 points at a particular one of latitude indicia 172, dial-type latitude indicator 164A is said to "read " or to "indicate" that particular latitude value. In the schematic illustration of FIG. 2C, dial-type latitude indicator 164A reads 10° south latitude.

Controller 134 may be provided with knowledge for mathematical conversion between latitude indicia 172 of dial-type latitude indicator 164A and the encoder values of altitude encoder 136. In some embodiments, such mathematical conversion comprises relative linear scaling. For example, a relative difference of one degree of latitude may correspond to a relative difference of 100 encoder counts. In some embodiments, such conversion comprises more complicated mathematical transformations.

Figure 2D:
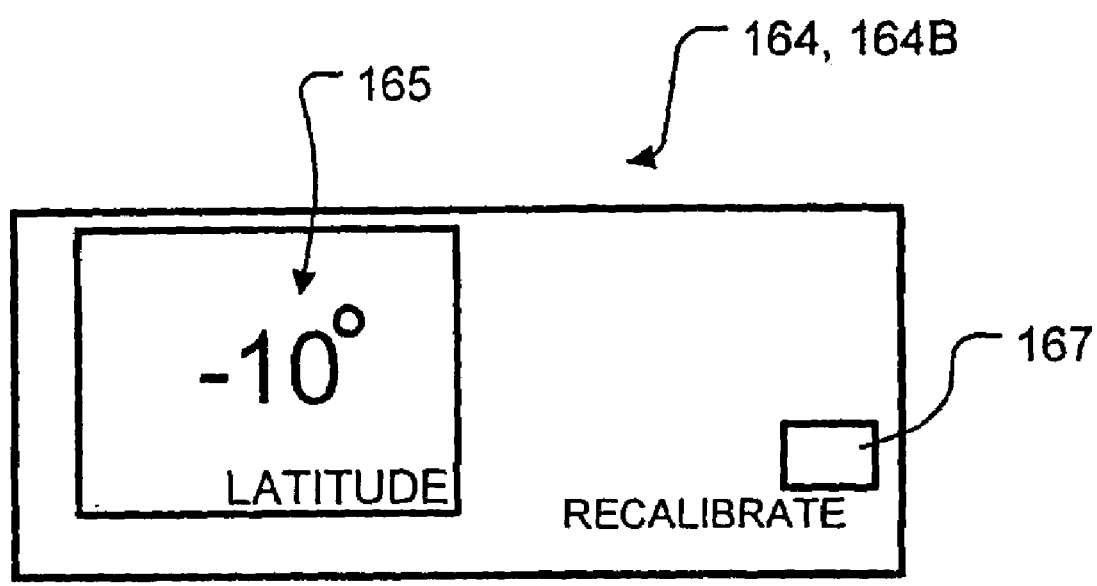
FIG. 2D is a schematic representation of a electronic-type latitude indicator.

FIG. 2D shows a latitude indicator 164 according to an alternative embodiment. Latitude indicator 164 of FIG. 2D comprises an electronic-type latitude indicator 164B. Electronic-type latitude indicator 164B may be operationally (e.g. electronically) coupled to altitude encoder 136 and/or altitude pivot joint 124. Electronic-type latitude indicator 164B comprises a digital display 165 which directly displays information about latitudes on the surface of the Earth. In the illustrated embodiment, electronic-type latitude indicator 164B comprises an electronic recalibrate input 167. When digital display 165 indicates a particular numerical latitude value, electronic-type latitude indicator 164B is said to "read" or to "indicate" that particular numerical latitude value. In the illustrated embodiment of FIG. 2D, electronic-type latitude indicator 164B reads 100 south latitude. Controller 134 and/or display 165 may be provided with knowledge for mathematical conversion between the latitude values shown on display 165 of electronic-type latitude indicator 164B and the encoder values of altitude encoder 136. As with dial-type latitude indicator 164A, such mathematical conversion may comprise linear or non-linear transformations.

Referring back to calibration method 200 (FIG. 6), the purpose of block 230 is to provide controller 134 with calibration information about the latitude of the observer location. In accordance with calibration method 200 of FIG. 6, block 230 involves using keypad 144 to adjust the angular position of telescope tube 112 about its altitude axis until latitude indicator 164 reads an "appropriate latitude value". The "appropriate latitude value" may be determined using a number of techniques discussed below.

FIG. 6A is a schematic block diagram representation of one method 232A which may be used to adjust latitude indicator 164 to read the "appropriate latitude value" (i.e. to perform the procedures of block 230). In accordance with method 232A, latitude indicator 164 is calibratable, such that when the altitude coordinate of telescope tube 112 is zeroed and reset in blocks 210, 220 (i.e. telescope tube 112 is leveled), the user recalibrates latitude indicator 164 in block 234A, such that latitude indicator 164 reads zero degrees latitude when telescope tube 112 is leveled.

Figure 7A:
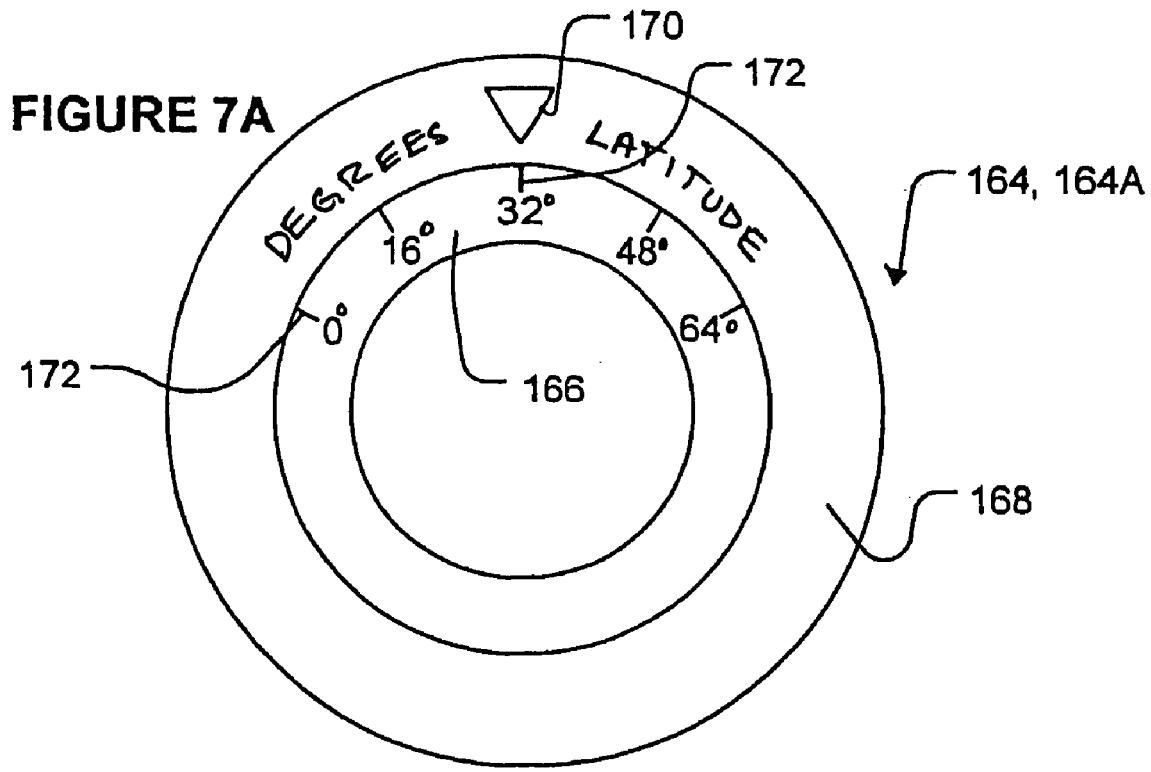
FIGS. 7A–7C depict a schematic representation of one method for implementing the FIG. 6A procedure and adjusting a dial-type latitude indicator to an appropriate latitude value in accordance with a particular embodiment of the invention.
Figure 7B:
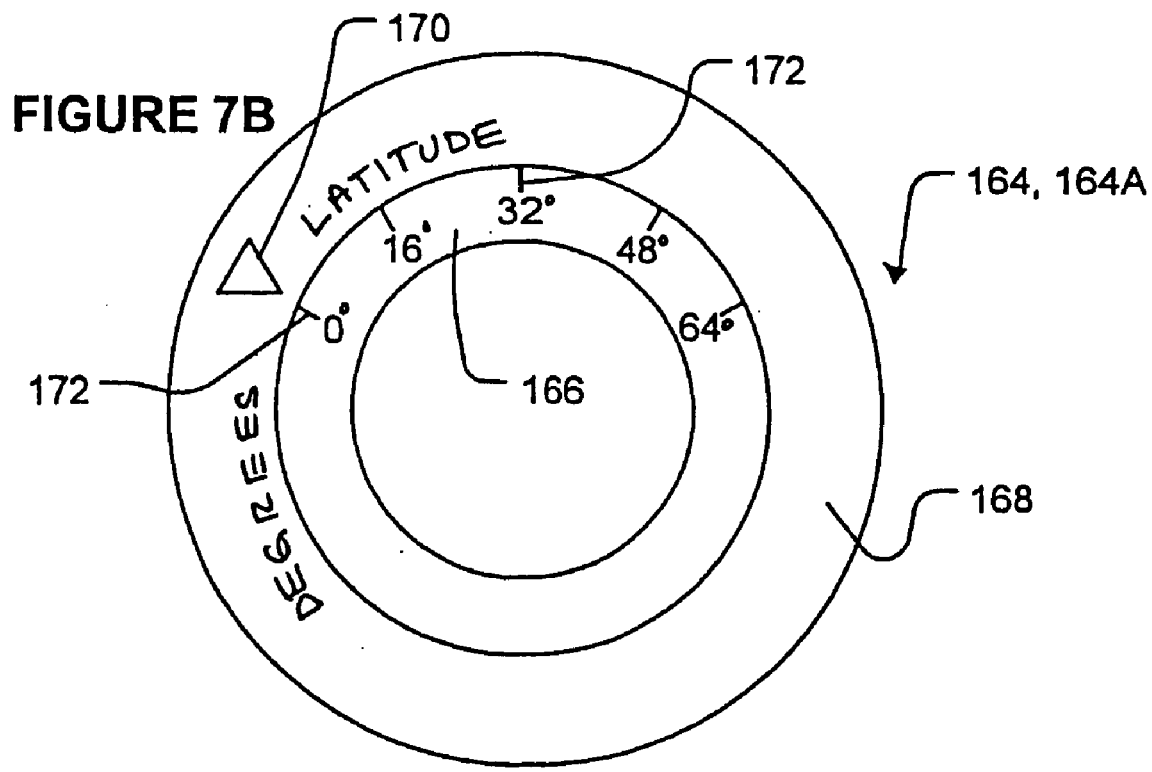

FIGS. 7A and 7B schematically depict an example of the block 232A recalibration on a dial-type latitude indicator 164A. Some detail has been omitted from FIGS. 7A and 7B for clarity. In FIG. 7A, it is assumed that telescope tube 112 has been leveled as described above (block 210, 220), such that the altitude coordinate of telescope tube 112 is zero. In the example of FIG. 7A, when telescope tube 112 is initially leveled, dial-type latitude indicator 164A reads 32° north. Recalibration of dial-type latitude indicator 164A involves physically recalibrating dial-type latitude indicator 164A such that it reads 0° latitude when telescope tube 112 is leveled. FIG. 7B depicts dial-type latitude indicator 164A after it has been recalibrated such that it reads 0° latitude.

In the example of FIGS. 7A and 7B, dial-type latitude indicator 164A is physically recalibratable. In accordance with one particular embodiment, the block 234A recalibration involves: decoupling second portion 168 of dial-type latitude indicator 164A from telescope tube 112 (not shown in FIGS. 7A, 7B); pivoting second portion 168 relative to first portion 166 and relative to telescope tube 112 while tube 112 is still level until pointer element 170 points at the particular latitude indicia 172 corresponding to zero degrees latitude (as shown in FIG. 7B); and then recoupling second portion 168 to telescope tube 112.

Where latitude indicator 164 is a electronic-type latitude indicator, such as electronic-type latitude indicator 164B of FIG. 2D, the block 234A recalibration may be performed electronically, rather than physically. The block 234A recalibration may be performed on electronic-type latitude indicator 164B by activating recalibrate input 167 while telescope tube 112 is leveled. Recalibrate input 167 causes display 165 to read 0° latitude.

Once latitude indicator 164 is calibrated in block 234A, the "appropriate latitude value" to which latitude indicator 164 must be adjusted is the latitude of the current observer location. In block 236A, the user uses keypad 144 to adjust the altitude of telescope tube 112 until latitude indicator 164 reads a latitude value corresponding to the current latitude of the observer location. For example, if the user is located in Vancouver, Canada, where the latitude is approximately 49 degrees north, then, in block 236A, the user uses keypad 144 to adjust the altitude of telescope tube 112 until latitude indicator 164 reads 49 degrees north.

Figure 7C:
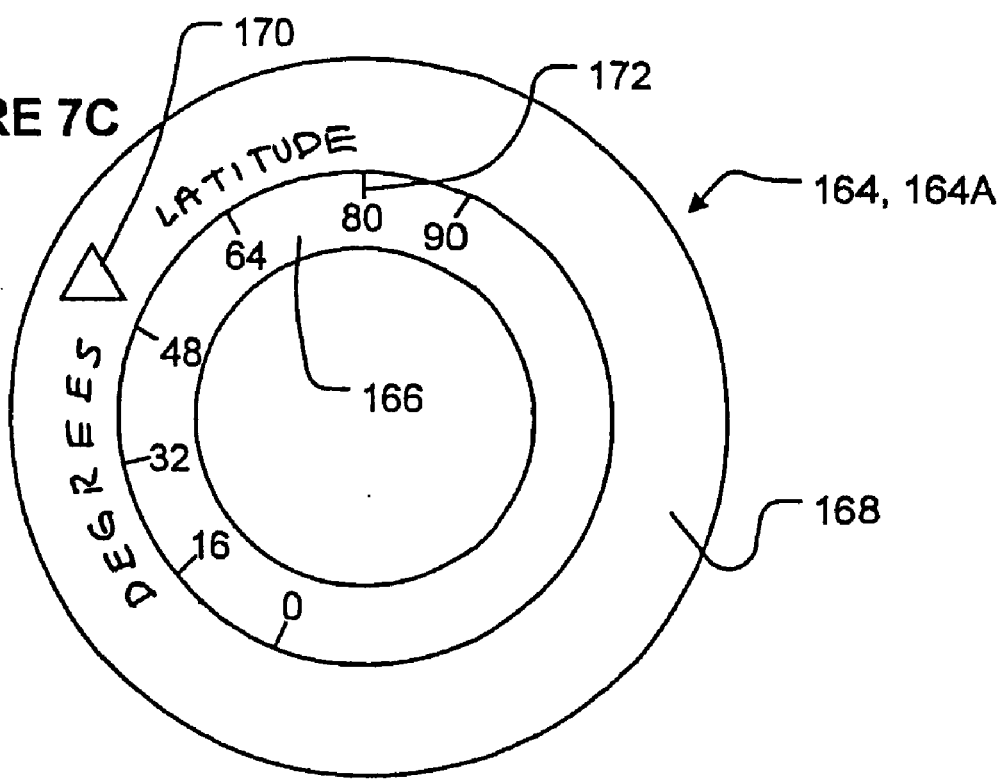

FIGS. 7B and 7C schematically depict an example of the block 236A adjustment on a dial-type latitude indicator 164A for the case where a user is located in Vancouver, Canada. FIG. 7B shows dial-type latitude indicator 164A right after the block 234A recalibration, where dial-type latitude indicator reads 0° latitude. In FIG. 7C, the user adjusts the position of telescope tube 112 about its altitude axis 114 until dial-type latitude indicator 164A reads 49° north. Where latitude indicator 164 is a electronic-type latitude indicator (such as electronic-type latitude indicator 164B of FIG. 2D) and the observer location is in Vancouver, Canada, the block 236A adjustment may be performed by adjusting the altitude of telescope tube 112 until display 165 reads 49° north.

FIG. 6B is a schematic block diagram representation of another method 232B which may be used to adjust latitude indicator 164 to read the "appropriate latitude value" (i.e. to perform the procedures of block 230). In accordance with method 232B, the user reads latitude indicator 164 when the altitude coordinate of telescope tube 112 is zeroed and reset in blocks 210, 220 (i.e. telescope tube 112 is leveled). In block 234B, the user adds the reading of latitude indicator 164 to the latitude of the observer location to obtain the appropriate latitude value. If the observer location is in the Southern hemisphere, then the latitude of the observer location is subtracted from the reading of latitude indicator 164 obtained in blocks 210, 220 to obtain the appropriate latitude value. In block 236B, the user uses keypad 144 to adjust the altitude of telescope tube 112 until latitude indicator 164 reads the appropriate latitude value determined in block 234B.

Figure 8A:
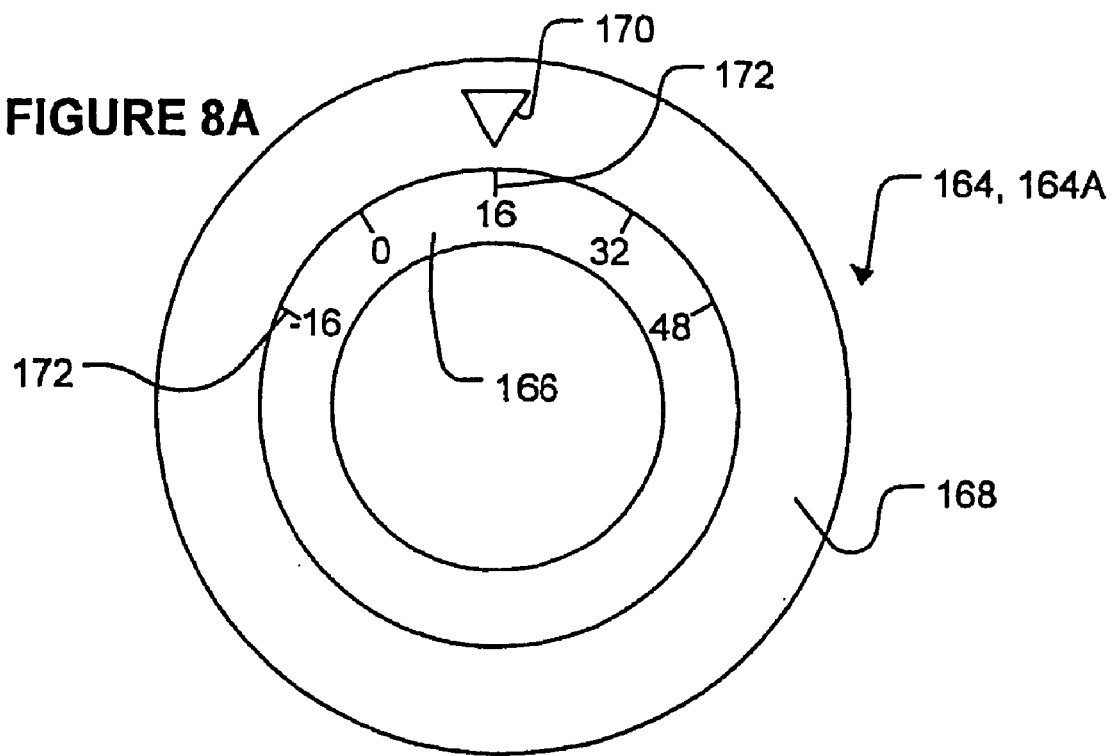
FIGS. 8A–8B depict a schematic representation of one method for implementing the FIG. 6B procedure and adjusting a dial-type latitude indicator to an appropriate latitude value in accordance with a particular embodiment of the invention.
Figure 8B:
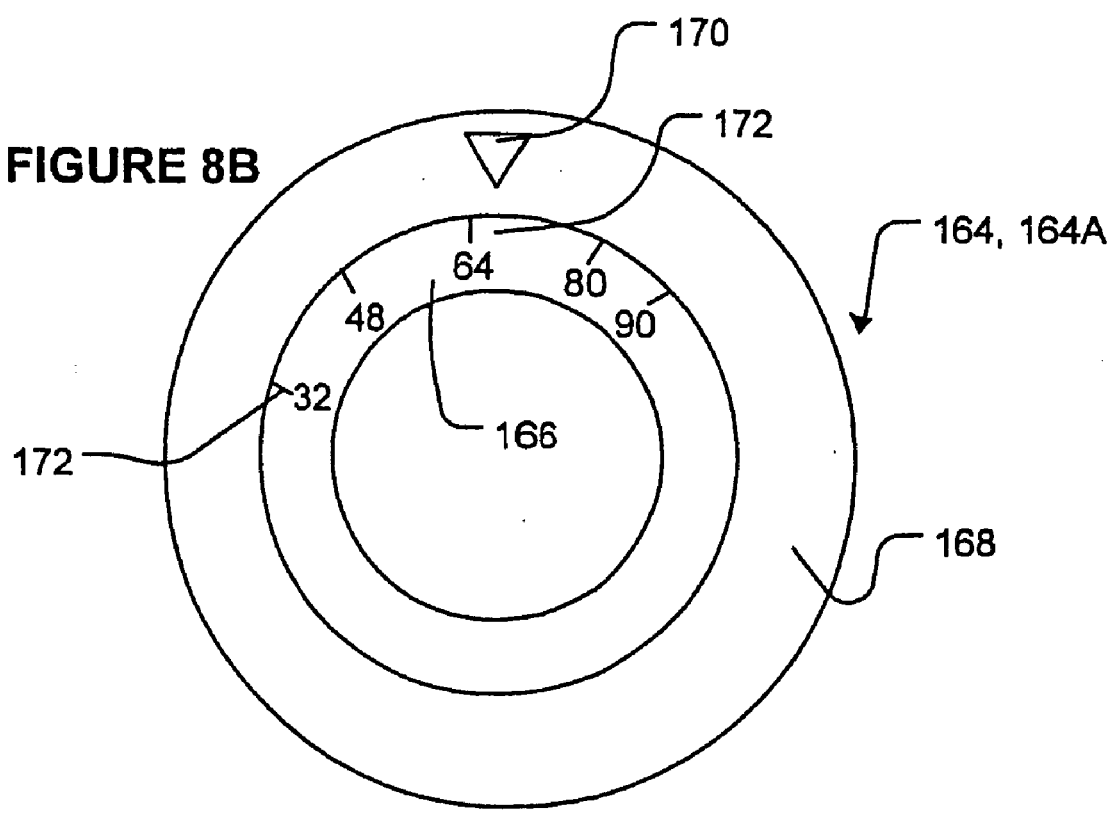

FIGS. 8A and 8B schematically depict an example of method 232B on a dial-type latitude indicator 164A for the case where the observer location is Vancouver, Canada. FIG. 5A shows dial-type latitude indicator 164A after zeroing and resetting the altitude coordinate of telescope tube 112 in blocks 210, 220. In the example of FIG. 8A, dial-type latitude indicator 164A reads 16° north when telescope tube 112 is initially leveled. The user then calculates the "appropriate latitude value" to be 16° north+49° north=67° north. In block 236B, the user adjusts the position of telescope tube 112 about its altitude axis 114 until dial-type latitude indicator 164A reads 67° north (i.e. the appropriate latitude value). This adjustment of telescope tube 112 is shown, in FIG. 8B.

Where latitude indicator 164 is an electronic-type latitude indicator (such as electronic-type latitude indicator 164B of FIG. 2D), method 232B is substantially similar, except that block 236B involves adjusting the altitude of telescope tube 112 until display 165 reads the appropriate latitude value.

Returning to calibration method 200 of FIG. 6, after adjusting the altitude of telescope tube 112 until latitude indicator 164 reads the appropriate latitude value (block 230), method 200 proceeds to block 240. In block 240, the user triggers controller 134 to determine a new system representation of the observer latitude (i.e. the observer latitude according to controller 134). In block 240, controller 134 determines the difference between the value of altitude encoder 136 at the conclusion of block 230 and the value of altitude encoder 136 determined in block 220. The result of the block 240 difference determination represents one possible system representation of the observer latitude. The actual observer latitude is preferably mathematically related to the result of the block 240 difference determination. In particular embodiments, the actual observer latitude may be determined by scaling the result of the block 240 difference determination by a linear scaling factor.

In one particular embodiment, block 240 difference determination is triggered when the user simultaneously activates inputs 152, 154 (see FIG. 4). Block 250 involves storing the new system representation of the observer latitude (e.g. in memory 134A (FIG. 3)). The stored system representation of the observer latitude may comprise the result of the block 240 difference determination. However, as discussed above, the system representation of the observer latitude may be maintained (e.g. stored and/or processed) in a variety of different formats, such as a difference in encoder counts, angular units, trigonometric functions of angular units and/or other mathematically equivalent information.

In block 260, calibration procedure 200 is complete and telescope system 100 and control system 132 are ready to perform auto-tracking operations. In one particular embodiment, a user commences auto-tracking by centering a desired celestial object in the field of view of telescope 112 and then simultaneously activating user inputs 150 and 152 (see FIG. 4). Control system 132 then causes telescope tube 112 to track the desired object as described above.

Figure 9:
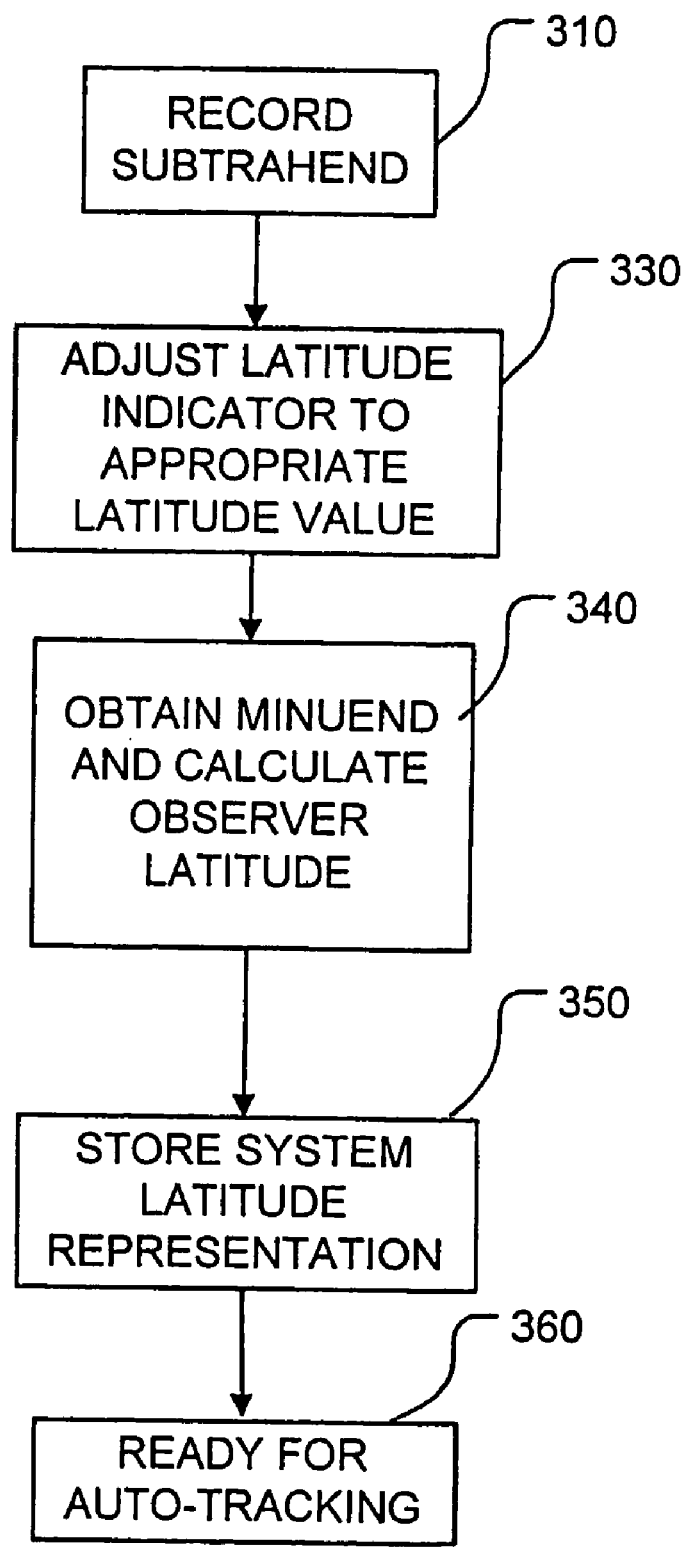
FIG. 9 is a schematic representation of a method for providing the FIG. 2A telescope system with the latitude of the observer location in accordance with an alternative embodiment of the invention.

FIG. 9 depicts a calibration procedure 300 according to an alternative embodiment of the invention, wherein the latitude of the observer location is input to telescope system 100. Calibration procedure 300 differs from calibration procedure 200 in that calibration procedure 300 obtains a new system representation of the observer latitude, without recalibrating the system representations of the altitude and azimuthal coordinates. Calibration method 300 begins in block 310, where controller 134 records the current value of altitude encoder 136 in response to the user activating one or more user inputs (not shown). Controller 134 uses this value of altitude encoder 136 as the substrahend in a subsequent latitude calculation described below.

In block 330, the user provides controller 134 with information about the latitude of the observer location. Block 330 involves adjusting the angular position of telescope tube 112 about its altitude axis until latitude indicator 164 reads an "appropriate latitude value". Determining the appropriate latitude value may be accomplished in a manner similar to either of the procedures 232A, 232B described above, except that the altitude coordinate of telescope tube 112 is not zeroed prior to determining the appropriate latitude value.

The appropriate latitude value may be determined by recalibrating latitude indicator 164 in a manner similar to method 232A of FIG. 6A, in which case the appropriate latitude value is the actual observer latitude. The altitude coordinate of telescope tube 112 is maintained in its block 310 position during recalibration of latitude indicator 164. Alternatively, the appropriate latitude value may be determined by adding the observer latitude to the latitude reading taken from latitude indicator 164 during block 310 in a manner similar to method 232B of FIG. 6B. As a part of block 330, the user uses keypad 144 to adjust the angular position of telescope tube 112 about its altitude axis 114 until latitude indicator 164 reads the appropriate latitude value.

In block 340, after adjusting the altitude of telescope tube 112 until latitude indicator 164 reads the appropriate latitude value, the user provides controller 134 with an indication to determine a new system representation of the observer latitude. The indication provided by the user to perform this determination may comprise activating one or more user inputs (not shown). Controller 134 performs this determination by using the value of altitude encoder 136 when latitude indicator 164 is directed at the "appropriate altitude value" (i.e. the value of altitude encoder 136 in block 340) as the minuend in a subtraction calculation. The subtraction calculation involves subtracting the subtrahend obtained in block 310 from the minuend obtained in block 340 to determine a difference value.

This block 340 difference value represents one possible system representation for the latitude of the observer location. The block 340 difference value is preferably mathematically related to the actual observer latitude. In particular embodiments, the actual observer latitude may be determined by scaling the block 340 difference value by a linear scaling factor. In block 350 of the illustrated embodiment, controller 134 stores a system representation of the observer latitude (e.g. in memory 134A). The stored system representation of the observer latitude may be the block 340 difference value. However, as discussed above, the system representation of the observer latitude may be maintained in a variety of formats.

Figure 10:
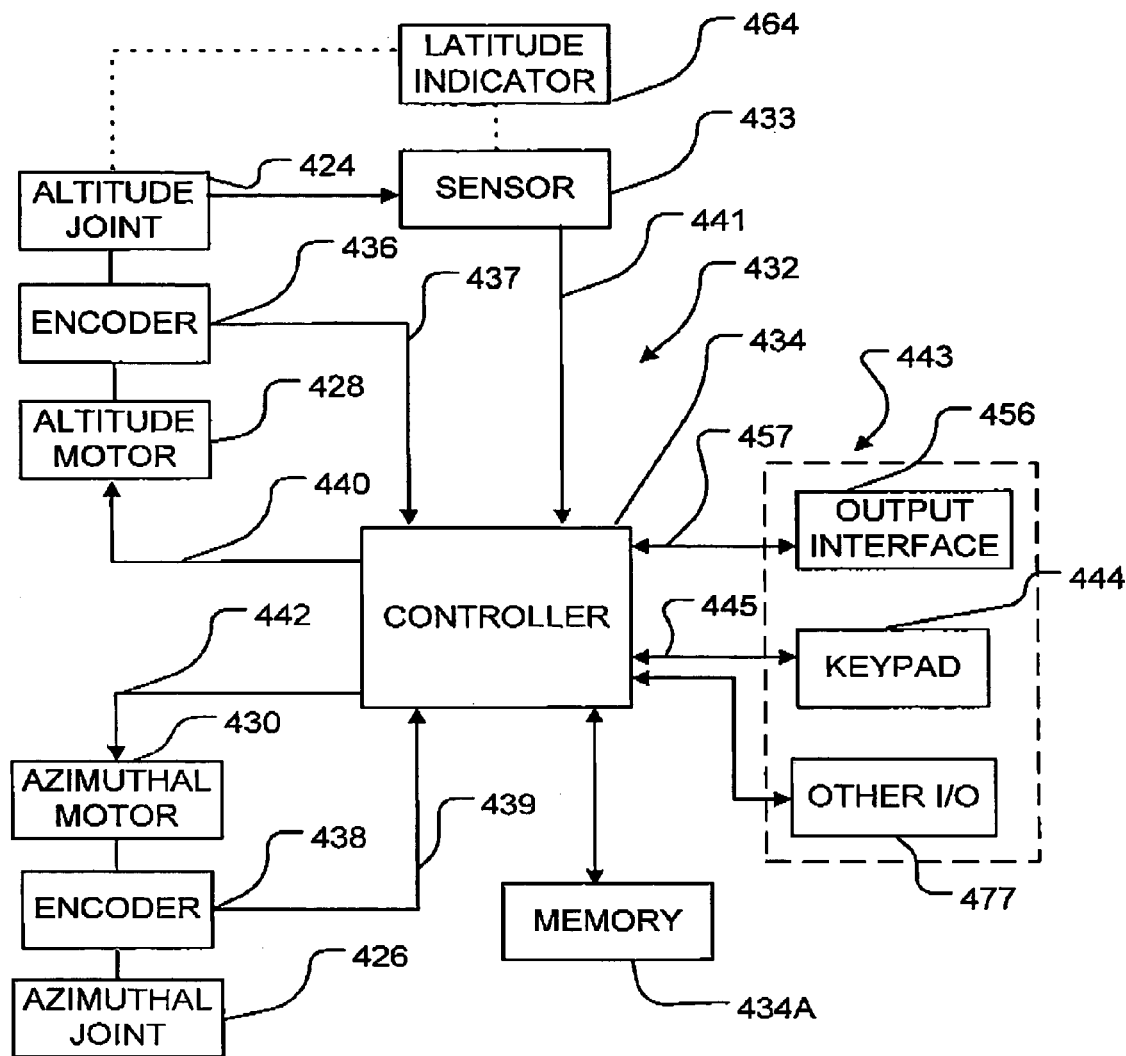
FIG. 10 is a schematic representation of a control system that may be used in the telescope system of FIG. 2A.

FIG. 10 depicts a telescope control system 432 according to an alternative embodiment of the invention. In many respects, control system 432 is similar to control system 132 of FIG. 3. Features of control system 432 (FIG. 10) that are similar to features of control system 132 (FIG. 3) are provided with similar reference numerals preceded by the digit "4" rather than "1". Control system 432 differs from control system 132 in that control system 432 comprises an additional sensor 433. In the illustrated embodiment, sensor 433 is coupled to altitude pivot joint 424.

In the illustrated embodiment of FIG. 10, sensor 433 senses information about the angular position of telescope tube 112 about altitude axis 114 and provides this information to controller 432 via signal 441 and, if required, an analog to digital converter (not shown). Sensor 433 may comprise a wide variety of positional and/or angular sensors capable of detecting the angular position of telescope tube 112 about altitude axis 114. By way of non-limiting examples, sensor 433 may comprise a potentiometer or an inductive sensor, which directly senses the angular position of telescope tube 112 about altitude axis 114, or sensor 433 may comprise a photoelectric or laser sensor, which indirectly senses the angular position of telescope tube 112 about altitude axis 114 by detecting the separation distance of a point on tube 112 from a fixed reference point. Preferably, controller 432 is precalibrated with information about sensor 433. For example, controller 432 may be preprogrammed with a zero reference for sensor 433.

In the illustrated embodiment, control system 432 comprises a latitude indicator 464 which is also coupled to altitude pivot joint 424. Latitude indicator 464 may be substantially similar to any of the latitude indicators described herein. Latitude indicator 464 reads a latitude value which depends on the angular position of telescope tube 112 about altitude pivot joint 424. Preferably, the relationship between the reading of latitude indicator 464 and output signal 441 of sensor 433 is known to controller 432. That is, controller 432 is preferably capable of determining the reading of latitude indicator 464 based on sensor output signal 441. This relationship may be preprogrammed into controller 432.

Figure 11:
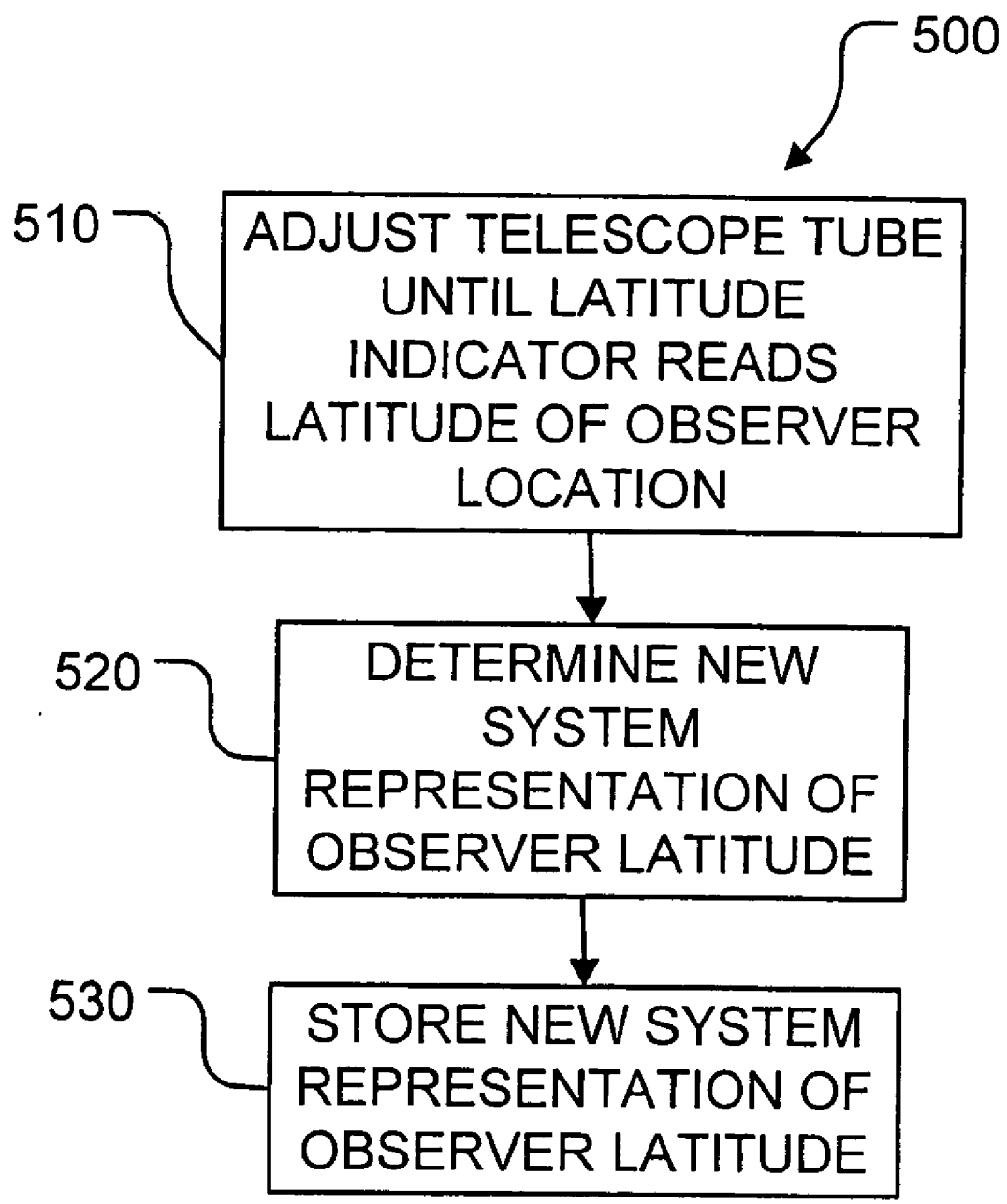
FIG. 11 is a schematic representation of a method for providing the FIG. 2A telescope system with the latitude of the observer location in accordance with an alternative embodiment of the invention.

FIG. 11 depicts a method 500 of calibrating telescope system 400 to input the latitude of the observer location according to another embodiment of the invention. Method 500 commences in block 510, where a user adjusts the altitude coordinate of telescope tube 112 until dial indicator 464 reads a latitude value corresponding to the latitude of the observer location. The block 510 adjustment may be accomplished using user inputs 146 on keypad 144 for example.

In block 520, the user provides controller 432 with an indication (e.g. activating a user input) that controller 432 should determine a new system representation of the observer latitude. After receiving this indication, controller 432 determines a new system representation of the observer latitude based on signal 441 from sensor 433. Determining the new system representation of the observer latitude may involve a calculation in accordance with the relationship between sensor output signal 441 and the reading of latitude indicator 464. Such a calculation may involve offsetting, scaling and/or other processing. The relationship between sensor output signal 441 and the reading of latitude indicator 464 may be a linear or non-linear relationship. The newly determined system representation of the observer latitude is stored in block 530. As discussed above, the system representation of the observer latitude may be stored in a variety of formats.

As will be apparent to those skilled in the art in the light of the foregoing disclosure, many alterations and modifications are possible in the practice of this invention without departing from the spirit or scope thereof. For example:

In the embodiment described above, telescope system 100 comprises a Dobsonian telescope. In general, the invention described herein may be implemented using any type of telescope which comprises an alt-az mount. Such alt-az mounts may be single arm alt-az mounts or fork-type alt-az mounts, for example. By way of non-limiting example, such telescopes may include: Scmidt-Cassegrain telescopes, Maksutov-Cassegrain telescopes, Newtonian telescopes, catadioptic telescopes, reflecting telescopes, refracting telescopes and spotting telescopes.

Keypad 144 is shown above having multiple user inputs 150, 152, 154 for speed control. In an alternative embodiment, speed control is achieved by holding down a direction control input 146A, 146B, 148A, 148B for a longer period of time, such that the speed of movement of telescope tube 112 increases when a user holds down direction a control input 146A, 146B, 148A, 148B for a longer period of time. In such embodiments, separate speed control inputs 150, 152 and 154 are not required.

In the FIG. 4 embodiment of keypad 144 and the FIG. 2D embodiment of electronic-type latitude indicator 164B, user inputs 146A, 146B, 148A, 148B, 150, 152, 154, 167 are embodied in the form of buttons. Those skilled in the art will appreciate that user inputs 146A, 146B, 148A, 148B, 150, 152, 154, 167 could comprise other user input devices, such as switches, touch pads, rollers, joysticks or the like.

The FIG. 5 embodiment of output interface 156 comprises an alphanumeric display 160. In less expensive embodiments, alphanumeric display may be replaced with mechanical gauges, dials and/or setting circles which provide an indication of the altitude and azimuthal coordinates of telescope tube 112.

Calibration procedures 200, 300, 500 described above involve a user using keypad 144 to manipulate telescope tube 112 during calibration. Those skilled in the art will appreciate that use of keypad 144 is not required and that a user may manipulate telescope tube 112 about its axes 114, 118 by hand during calibration.

In the embodiment described above, keypad 144 comprises a reset input 149, which is used in block 220 (FIG. 6) to reset the system representations of the altitude and azimuthal coordinates. In an alternative embodiment of the invention, control system 132 is configured to reset the system altitude and azimuthal coordinates each time the user turns on the power to control system 132 via a power switch (not shown). In such embodiments, a user zeroes the altitude and azimuthal coordinates of telescope tube 112 prior to powering on control system 132.

In the illustrated embodiment of FIGS. 2B and 2C, pointer element 170 moves with telescope tube 112 about altitude axis 114 and latitude indicia 172 are fixed. In other embodiments, latitude indicia 172 move with telescope tube 112 about altitude axis 114 and pointer element 170 is fixed.

In some embodiments, telescope systems 100 may comprise a latitude indicator similar to latitude indicator 164 which is coupled to azimuthal pivot joint 126. Such a latitude indicator could provide latitude indicia that are fixed in position and a pointer element that moves with telescope tube 112 about azimuthal axis 118 to point at the latitude indicia. Alternatively, such a latitude indicator could provide a fixed pointer element and latitude indicia that move with telescope tube 112 about azimuthal axis 118. Because methods 200, 300 described above determine the system representation of the latitude of the observer location by using a difference between encoder values, it does not matter to controller 134 whether it is measuring such a difference using altitude encoder 136 or azimuthal encoder 138. Accordingly, the above-described methods 200, 300 may be performed using a latitude indicator coupled to azimuthal pivot joint 126. Such methods would be substantially similar to the above-described methods 200, 300 except that azimuthal axis 118 is used and the user pivots telescope tube 112 about azimuthal axis 118.

In some embodiments, telescope systems 400 may comprise a latitude indicator similar to latitude indicator 464 which is coupled to azimuthal pivot joint 426. In such embodiments, method 500 could be accomplished by adjustment of telescope tube 112 about azimuthal axis 118.

In some embodiments, a user is capable of using inputs 146A, 146B, 148A, 148B to override an auto-tracking function. This may be done where the calibration performed prior to auto-tracking is not perfect and the auto-tracking of telescope system 100 does not keep the desired object perfectly centered in the telescope field of view. In preferred embodiments, the speeds of motors 128, 130 may be reduced in response to user inputs 146A, 146B, 148A, 148B that are activated during an auto-tracking operation. For example, the slow, medium and fast speeds of motors 128, 130 may be 64, 128 and 256 times the sidereal rate when auto-tracking is not being performed and may be 4, 16 and 32 times the sidereal rate when auto-tracking is being performed.

When a user overrides an auto-tracking operation to keep a desired celestial object in the field of view, the control system 132 may use information obtained from this override to recalibrate its latitude information using the auto-tracking equations to solve for the latitude of the observer location (Lat).

In another alternative embodiment of the invention, telescope system 100 comprises an additional I/O port 177 which may be connected to a computer (not shown). The computer may run calibration software which prompts a user to input the current observer latitude and/or additional calibration information which may be useful to controller 134. In another alternative embodiment, user interface 143 may comprise I/O components and similar software may be run by telescope system 100 to obtain the current observer latitude and/or additional calibration information which may be useful to controller 134. Such additional calibration information may comprise the sidereal time (or mathematically equivalent information) at the observer location. Such additional information may allow telescope system 100 to perform "GO TO" operations, because the observer latitude and sidereal time (or mathematically equivalent information) represent all of the information required to perform transformations between the celestial coordinate system and the local alt-az coordinate system at any given observer location. Mathematically equivalent information to the sidereal time may include the longitude of the observer location and the local time and date at the observer location, for example.

In the embodiments described above, the latitude indicators are provided with a linear latitude scale. For example, each degree of latitude on the latitude indicator corresponds to a constant number of counts of the encoder to which it is coupled. This linear scale is convenient, because it simplifies the calibration of system with information about the observer latitude. For example, the actual observer latitude can be determined by multiplying a linear scaling factor by the encoder count difference determined in block 240 (FIG. 6) or block 340 (FIG. 7). In alternative embodiments, however, it may be useful to provide a latitude indicator with a non-linear scale. For example, most of the world's population may reside between 0–50° north or south latitude. Accordingly, it may be useful to provide a latitude indicator with a relatively fine scale between −50° to 50° and a relatively coarse scale in a region between −90° to −50° and 50° to 90°. For example, the scale of such a latitude indicator may correspond to 100 encoder counts per degree of latitude between −50° to 50° and 20 encoder counts per degree of latitude between −90° to −50° and 50° to 90°. In such embodiment, controller 134 is provided a priori with information about the non-linear relationship between the latitude indicator and the encoder to which it is coupled.

Accordingly, the scope of the invention is to be construed in accordance with the substance defined by the following claims.

What is claimed is:

1. A method for calibrating an alt-az telescope system with a latitude of an observer location to allow the telescope system to automatically track celestial objects, the method comprising:

providing a telescope tube mounted to a base for pivotal motion about an altitude axis that is generally parallel to a plane of the base and an azimuthal axis that is generally normal to the plane of the base;

providing a latitude indicator coupled to a corresponding one of the altitude and azimuthal axes, the latitude indicator indicating a altitude value which varies with movement of the telescope tube about the corresponding axis;

inputting an internal latitude representation of the latitude of the observer location in a controller of the telescope system by:

providing the controller with access to information indicative of a first angular position of the telescope tube about the corresponding axis, wherein at the first angular position, the latitude indicator indicates a first latitude value; adjusting an orientation of the telescope tube about the corresponding axis to a second angular position, wherein at the second angular position, the latitude indicator indicates a second latitude value that differs from the first latitude value by an amount corresponding to the observer latitude; providing the controller with access to information indicative of the second angular position; and performing a subtraction operation in the controller to subtract the information indicative of the first angular position from the information indicative of the second angular position and to thereby determine a difference value, the difference value indicative of the latitude of the observer location and whereby the internal latitude representation is based on the difference value.

2. A method according to claim 1 wherein providing the latitude indicator comprises providing a dial-type latitude indicator comprising latitude indicia that indicate latitude values and a pointer element, the latitude indicia and the pointer element moveable relative to one another with movement of the telescope tube about the corresponding axis.

3. A method according to claim 2 wherein when the telescope tube is in the first angular position, the pointer element points at one of the latitude indicia which indicates the first latitude value.

4. A method according to claim 3 wherein when the telescope tube is in the second angular position, the pointer element points at one of the latitude indicia which indicates the second latitude value.

5. A method according to claim 4 wherein providing the controller with access to the information indicative of the first angular position comprises obtaining a first encoder count value from an encoder coupled to the corresponding axis.

6. A method according to claim 5 wherein providing the controller with access to the information indicative of the second angular position comprises obtaining a second encoder count value from the encoder coupled to the corresponding axis.

7. A method according to claim 6 comprising, prior to adjusting the orientation of the telescope tube, physically recalibrating the dial-type latitude indicator, such that the pointer element points at one of the latitude indicia which indicates zero degrees latitude and the first latitude value is zero degrees latitude.

8. A method according to claim 7 comprising storing the difference value in memory as a system representation of the observer latitude.

9. A method according to claim 7 comprising processing the difference value to obtain trigonometric functions of the observer latitude and storing the trigonometric functions of the observer latitude.

10. A method according to claim 9 wherein processing the difference value comprises at least one of: scaling the difference value and subtracting an offset from the difference value.

11. A method according to claim 7 comprising obtaining trigonometric functions of the observer latitude from a look up table stored in memory.

12. A method according to claim 7 wherein adjusting the orientation of the telescope tube comprises controllably actuating a motor coupled to the corresponding axis using feedback from the encoder coupled to the corresponding axis.

13. A method according to claim 12 comprising, prior to providing the controller with access to the information indicative of the first angular position, adjusting the telescope tube to an orientation wherein the telescope tube is generally parallel to the base and adjusting the telescope tube to an orientation wherein the telescope tube is pointed generally toward true North.

14. A method according to claim 13 comprising recalibrating a system representation of the altitude coordinate when the telescope tube is in the orientation wherein the telescope tube is generally parallel to the base and recalibrating a system representation of the azimuthal coordinate when the telescope tube is in the orientation wherein the telescope tube is pointed generally toward true north.

15. A method according to claim 14 wherein the corresponding axis is the altitude axis.

16. A method according to claim 14 wherein the corresponding axis is the azimuthal axis.

17. A method according to claim 1 wherein providing the controller with access to the information indicative of the first angular position comprises obtaining a first encoder count value from an encoder coupled to the corresponding axis.

18. A method according to claim 17 wherein providing the controller with access to the information indicative of the second angular position comprises obtaining a second encoder count value from the encoder coupled to the corresponding axis.

19. A method according to claim 1 wherein adjusting an orientation of the telescope tube comprises controllably actuating a motor coupled to the corresponding axis using feedback from an encoder coupled to the corresponding axis.

20. A method according to claim 1 comprising, prior to providing the controller with access to the information indicative of the first angular position, adjusting the telescope tube to an orientation wherein the telescope tube is generally parallel to the base and adjusting the telescope tube to an orientation wherein the telescope tube is pointed generally toward true north.

21. A method according to claim 20 comprising recalibrating a system representation of the altitude coordinate when the telescope tube is in the orientation wherein the telescope tube is parallel to the base and recalibrating a system representation of the azimuthal coordinate when the telescope tube is in the orientation wherein the telescope tube is pointed toward true North.

22. A method according to claim 1 wherein the corresponding axis is the altitude axis.

23. A method according to claim 1 wherein the corresponding axis is the azimuthal axis.

24. A method according to claim 2 comprising, prior to adjusting the orientation of the telescope tube, physically recalibrating the dial-type latitude indicator, such that the pointer element points at one of the latitude indicia which indicates zero degrees latitude and the first latitude value is zero degrees latitude.

25. A method according to claim 1 wherein the latitude indicator comprises an electronic-type latitude indicator having a display which indicates latitude values.

26. A method according to claim 25 comprising, prior to adjusting the orientation of the telescope tube, electronically recalibrating the latitude indicator such that the display indicates zero degrees latitude and the first latitude value is zero degrees latitude.

27. A method according to claim 1 wherein the difference value is scalable by a linear scaling factor to obtain an actual observer latitude.

28. A method according to claim 7 wherein the difference value is scalable by a linear scaling factor to obtain an actual observer latitude.

29. A method according to claim 1 wherein the difference value is related to an actual observer latitude by a non-linear mathematical relationship.

30. A method according to claim 7 wherein the difference value is related to an actual observer latitude by a non-linear mathematical relationship.

31. An alt-az telescope system for automatically tracking celestial objects, the system comprising:
   a mount for supporting a telescope tube the mount having a base and altitude and azimuthal pivot joints configured to pivot the telescope tube about an altitude axis that is generally parallel to a plane of the base and an azimuthal axis that is generally normal to the plane of the base and corresponding altitude and azimuthal encoders connected to detect information indicative of angular positions of the telescope tube about its altitude and azimuthal axes;
   a latitude indicator coupled to a corresponding one of the altitude and azimuthal pivot joints, the latitude indicator indicating a latitude value which varies with movement of the corresponding pivot joint; and
   a controller connected to the altitude and azimuthal encoders so as to receive angular position information from the encoders, the controller configured to receive input of a latitude of an observer location by obtaining first angular position information from the encoder associated with the corresponding pivot point at a first angular position obtaining second angular position information from the encoder associated with the corresponding pivot point at a second angular position subtracting the first angular position information from the second angular position information to determine a difference value, the difference value indicative of the latitude of an observer location when the first and second angular positions are selected such that a difference in the latitude information indicated by the latitude indicator at the first and second angular positions corresponds to the observer latitude and whereby an internal latitude representation of the latitude of the observer location is based on the difference value.

32. A telescope system according to claim 31 wherein the latitude indicator comprises a dial-type latitude indicator, the dial-type latitude indicator comprising latitude indicia that indicate latitude values and a pointer element, the latitude indicia and the pointer element moveable relative to one another with movement of the corresponding pivot joint.

33. A telescope system according to claim 31 wherein the dial-type latitude indicator is physically recalibratable, such that the pointer element is adjustable to point at one of the latitude indicia which corresponds to zero degrees latitude when the corresponding pivot joint is in the first angular position.

34. A telescope system according to claim 33 comprising a memory for storing at least one of: the difference value; a scaled version of the difference value; an offset version of the difference value; a scaled and offset version of the difference value; and one or more trigonometric functions of the latitude of the observer location indicated by the difference value.

35. A telescope system according to claim 31 wherein the difference value is scalable by a linear scaling factor to obtain an actual observer latitude.

36. A telescope system according to claim 31 wherein the difference value is related to an actual observer latitude by a non-linear mathematical relationship.

37. A method for entering a latitude value into & an alt-az telescope control system to adios the telescope control system to automatically track celestial objects, the method comprising:
providing a telescope tube mounted to a base for pivotal motion about an altitude axis that is generally parallel to a plane of the base and an azimuthal axis that is generally normal to the plane of the base; providing a latitude indicator coupled to a corresponding one of the altitude and azimuthal axes, the latitude indicator indicating a latitude value which the telescope tube about the varies with movement of corresponding axis;
inputting an internal latitude representation of the latitude of the observer location in a controller of the telescope system by:
providing an encoder coupled to the corresponding axis, the encoder producing an encoder signal indicating an angular position of the telescope tube about the corresponding axis; providing a controller with access to information indicative of a first angular position of the telescope tube about the corresponding axis from the encoder signal, wherein at the first angular position, the latitude indicator indicates a first latitude value adjusting an orientation of the telescope tube about the corresponding axis to a second angular position, wherein at the second angular position the latitude indicator indicates a second latitude value that differs from the first latitude value by an amount corresponding to the observer latitude; providing the controller with access to information indicative of the second angular position of the telescope tube about the corresponding axis from the encoder signal; and subtracting the information indicative of the first angular position from the information indicative of the second angular position in the controller to determine a difference value the difference value indicative of the latitude of the observer location and whereby an internal latitude representation of the latitude of the observer location is based on the difference value.

38. A method according to claim 1 comprising controllably moving the telescope tube about the altitude axis using feedback from an encoder coupled to the altitude axis and controllably moving the telescope tube about the azimuthal axis using feedback from an encoder coupled to the azimuthal axis to track a celestial object according to tracking equations:

$$\frac{\partial(Az)}{\partial t} = V_S[\sin(Lat) - \tan(Alt)\cos(Az)\cos(Lat)] \text{ and}$$

$$\frac{\partial(Alt)}{\partial t} = V_S[\sin(Az)\cos(Lat)]$$

where Alt represents an altitude coordinate of the telescope tube, Az represents an azimuthal coordinate of the telescope tube, $V_s$ represents a sidereal rate and Lat is a value representative of the difference value.

39. A method according to claim 38 comprising processing the difference value prior to using the difference value as the Lat value in the tracking equations, wherein processing the difference value comprises at least one of: scaling the difference value; adding an offset to the difference value; and processing the difference value in accordance with a non-linear mathematical relationship.

40. A telescope system according to claim 31 wherein the controller is configured to controllably move the telescope tube about the altitude and azimuthal axes using feedback from the altitude and azimuthal encoders to track a celestial object according to tracking equations:

$$\frac{\partial(Az)}{\partial t} = V_S[\sin(Lat) - \tan(Alt)\cos(Az)\cos(Lat)] \text{ and}$$

$$\frac{\partial(Alt)}{\partial t} = V_S[\sin(Az)\cos(Lat)]$$

where Alt represents an altitude coordinate of the telescope tube, Az represents an azimuthal coordinate of the telescope tube, $V_s$ represents a sidereal rate and Lat is a value representative of the difference value.

41. A telescope system according to claim 40 wherein, prior to using the difference value as the Lat value in the tracking equations, the controller is configured to process the difference value by performing at least one of: scaling the difference value; adding an offset to the difference value; and processing the difference value in accordance with a non-linear mathematical relationship.

* * * * *

UNITED STATES PATENT AND TRADEMARK OFFICE
CERTIFICATE OF CORRECTION

PATENT NO. : 6,972,902 B1 Page 1 of 1
APPLICATION NO. : 10/950568
DATED : December 6, 2005
INVENTOR(S) : Chen, Chin Chuan and Liu, Yan It is certified that error appears in the above-identified patent and that said Letters Patent is hereby corrected as shown below:

Column 24,
Lines 28-29, "at a first angular position obtaining second" should read -- at a first angular position, obtaining second --.
Lines 31-32, "at a second angular position subtracting" should read -- at a second angular position and subtracting --.

Column 25,
Line 2, "adios" should read -- allow --.
Lines 11-12, "value which the telescope tube about the varies with movement of corresponding axis" should read -- value which varies with movement of the telescope tube about the corresponding axis --.
Lines 23-24, "a first latitude value adjusting" should read -- a first latitude value; adjusting --.
Lines 35-36, "to determine a difference value the difference value" should read -- to determine a difference value, the difference value --.

Signed and Sealed this

Eighteenth Day of July, 2006

JON W. DUDAS
*Director of the United States Patent and Trademark Office*